US012472744B2

(12) United States Patent
Takekoshi et al.

(10) Patent No.: US 12,472,744 B2
(45) Date of Patent: Nov. 18, 2025

(54) PRINTING APPARATUS AND A METHOD OF CONTROLLING A PRINTING APPARATUS INCLUDING A CONTROL UNIT CONTROLLING A CLEANING OPERATION OF A WIPING UNIT WIPING AN EJECTION PORT SURFACE

(71) Applicant: CANON KABUSHIKI KAISHA, Tokyo (JP)

(72) Inventors: Rie Takekoshi, Kanagawa (JP); Toshimitsu Danzuka, Tokyo (JP); Akihiro Tomida, Kanagawa (JP); Akiko Aichi, Tokyo (JP); Keita Ishimi, Kanagawa (JP); Hiroto Kango, Tokyo (JP); Taku Yokozawa, Kanagawa (JP); Kazuo Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 70 days.

(21) Appl. No.: 18/340,649

(22) Filed: Jun. 23, 2023

(65) Prior Publication Data

US 2024/0010002 A1 Jan. 11, 2024

(30) Foreign Application Priority Data

Jul. 11, 2022 (JP) ................................ 2022-111285

(51) Int. Cl.
*B41J 2/165* (2006.01)
*B41J 2/175* (2006.01)

(52) U.S. Cl.
CPC ....... *B41J 2/16535* (2013.01); *B41J 2/17596* (2013.01); *B41J 2002/1655* (2013.01); *B41J 2002/1657* (2013.01)

(58) Field of Classification Search
None
See application file for complete search history.

(56) References Cited

U.S. PATENT DOCUMENTS 7,287,825 B2 10/2007 Furuichi et al. ......... B41J 2/165
7,290,858 B2 11/2007 Furuichi et al. ......... B41J 2/205
(Continued)

FOREIGN PATENT DOCUMENTS

JP 2017-124617 7/2017

OTHER PUBLICATIONS

U.S. Appl. No. 18/344,787, filed Jun. 29, 2023.
U.S. Appl. No. 18/347,273, filed Jul. 5, 2023.

*Primary Examiner* — Alejandro Valencia
(74) *Attorney, Agent, or Firm* — Venable LLP

(57) ABSTRACT

A printing apparatus including a print head ejecting ink, flowing from a first channel into a pressure chamber, from a nozzle, by driving an ejection energy generating element in the pressure chamber, a circulation pump circulates the ink in a circulation channel including the first channel, the pressure chamber, and a second channel that flows the ink from inside the pressure chamber to the outside, a wiping unit with a cleaning member that wipes an ejection port surface of an ejection port and a winding member that winds the cleaning member, and a control unit controls a cleaning operation in which the wiping unit wipes the ejection port surface. When the cleaning operation is performed after the circulation pump is stopped, the cleaning operation is changed based on an elapsed time from the time the circulation pump stopped driving, and the cleaning operation is controlled based on the elapsed time.

8 Claims, 19 Drawing Sheets

(56) References Cited

U.S. PATENT DOCUMENTS

| | | | | |
|---|---|---|---|---|
| 7,503,638 | B2 | 3/2009 | Sato et al. | B41J 2/165 |
| 7,857,409 | B2 | 12/2010 | Hayashi et al. | B41J 29/38 |
| 8,317,287 | B2 | 11/2012 | Jogo et al. | B41J 29/38 |
| 8,342,626 | B2 | 1/2013 | Kawamata et al. | B41J 11/00 |
| 8,342,638 | B2 | 1/2013 | Sole Pons et al. | 347/33 |
| 8,746,828 | B2 | 6/2014 | Kawamata et al. | B41J 29/38 |
| 8,752,930 | B2 | 6/2014 | Doi et al. | B41J 2/045 |
| 8,794,737 | B2 | 8/2014 | Taira et al. | B41J 2/165 |
| 8,882,232 | B2 | 11/2014 | Ibe et al. | B41J 29/393 |
| 8,967,768 | B2 | 3/2015 | Jogo et al. | B41J 23/00 |
| 9,114,651 | B2 | 8/2015 | Kato et al. | B41J 29/393 |
| 9,162,462 | B2 | 10/2015 | Komatsu et al. | B41J 2/165 |
| 9,561,658 | B2 | 2/2017 | Danzuka et al. | B41J 29/393 |
| 9,707,763 | B2 | 7/2017 | Nakagawa et al. | B41J 2/165 |
| 9,862,195 | B2 | 1/2018 | Genta et al. | B41J 2/165 |
| 9,902,157 | B2 | 2/2018 | Okushima et al. | B41J 2/175 |
| 10,369,797 | B2 | 8/2019 | Genta et al. | B41J 2/165 |
| 10,611,140 | B2 | 4/2020 | Takeuchi et al. | B41J 2/01 |
| 11,247,471 | B2 | 2/2022 | Narumi et al. | B41J 2/165 |
| 2018/0264822 | A1* | 9/2018 | Tanioku | B41J 2/16535 |
| 2021/0303225 | A1* | 9/2021 | Shirai | H04L 43/0811 |
| 2022/0126584 | A1 | 4/2022 | Narumi et al. | B41J 2/165 |
| 2022/0305792 | A1 | 9/2022 | Ishii et al. | B41J 2/165 |
| 2022/0324233 | A1 | 10/2022 | Uetsuki et al. | B41J 2/165 |
| 2022/0388321 | A1 | 12/2022 | Takekoshi et al. | B41J 25/00 |

* cited by examiner

FIG.9A
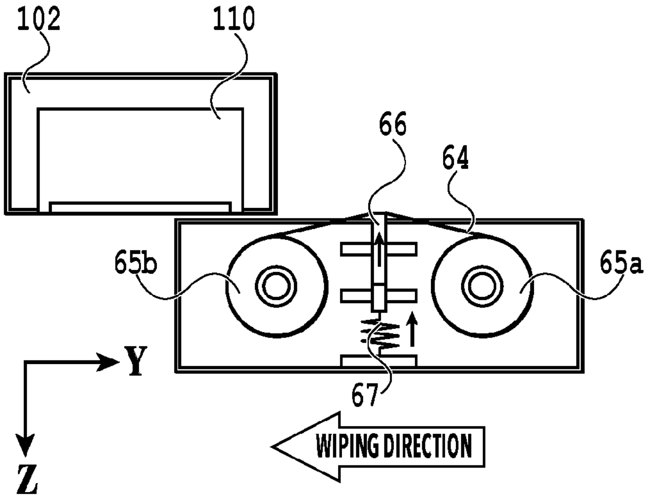
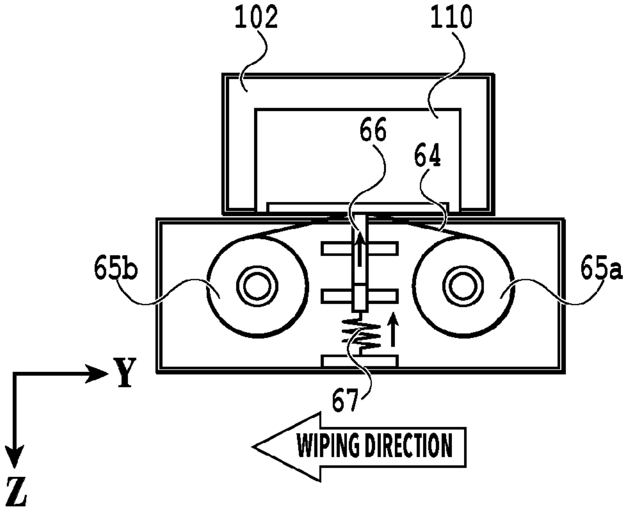
FIG.9B
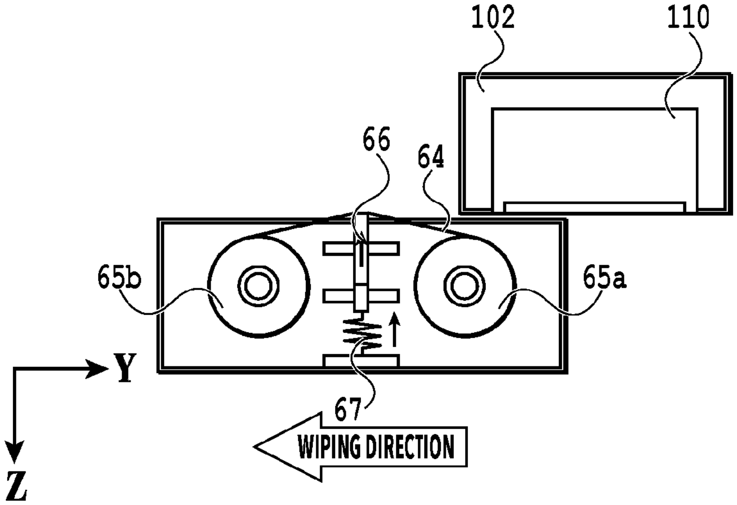
FIG.9C

PRINTING APPARATUS AND A METHOD OF CONTROLLING A PRINTING APPARATUS INCLUDING A CONTROL UNIT CONTROLLING A CLEANING OPERATION OF A WIPING UNIT WIPING AN EJECTION PORT SURFACE

CROSS-REFERENCE TO PRIORITY APPLICATION

This application claims the benefit of Japanese Patent Application No. 2022-111285, filed Jul. 11, 2022, which is hereby incorporated by reference herein in its entirety.

BACKGROUND

Field

The present disclosure relates to a wiping operation of a printing apparatus.

Description of the Related Art

Regarding inkjet printing apparatuses, there is a possibility that normal printing is hindered due to solidification of ink adhering to the vicinity of ejection ports of a print head or an increase in viscosity of ink. U.S. Pat. No. 8,342,638 proposes an inkjet printing apparatus equipped with a maintenance mechanism as a technique for wiping off ink adhering to ejection ports. The maintenance mechanism utilizes the movement of a carriage on which a print head is mounted, so as to push up a part of a sheet-like cleaning member, which is referred to as a web, to the ejection port surface of the print head. Accordingly, ink stagnation at ejection ports during ink ejection, adhering mist due to rebounding, dust, dirt, paper fibers, etc., in the atmosphere, or many particles carried by the air are wiped and removed.

Further, in Japanese Patent Laid-Open No. 2017-124617, as a technique for suppressing an increase in viscosity of ink, the pressure difference between two pressure adjustment mechanisms is utilized to generate an ink flow that passes through pressure chambers. With the ink flow circulating the ink through channels communicating with respective ejection ports and pressure chambers corresponding thereto, the increase in viscosity of the ink in the ejection ports is suppressed.

SUMMARY

However, by using the wiping configuration and the ink circulation configuration described in U.S. Pat. No. 8,342, 638 and Japanese Patent Laid-Open No. 2017-12461, there is a possibility of causing color mixture due to entering of ink from an ejection port. This is because, if the wiping is performed during ink circulation, mist of another color in the vicinity of an ejection port or bleed from an adjacent ink is mixed through the ejection port, and, if it is flowed deep into the print head due to the circulation, it will be difficult to be discharged. On the other hand, if the wiping is performed after the ink circulation is stopped, the color mixture is suppressed, but such a problem that the throughput drops occurs.

The printing apparatus according to an embodiment of the present disclosure includes a print head configured to eject ink, which has flowed from a first channel into a pressure chamber, from a nozzle by driving an ejection energy generating element installed in the pressure chamber, a circulation pump configured to circulate the ink in a circulation channel including the first channel, the pressure chamber, and a second channel that flows the ink inside the pressure chamber to the outside of the pressure chamber, a wiping unit configured with a cleaning member that can wipe an ejection port surface of an ejection port and a winding member that winds the cleaning member, and a control unit configured to control a cleaning operation in which the wiping unit wipes the ejection port surface, so that, in a case when the cleaning operation is performed after the circulation pump is stopped, the cleaning operation is changed based on an elapsed time from the time the circulation pump stopped driving.

Further features of the present invention will become apparent from the following description of exemplary embodiments with reference to the attached drawings.

BRIEF DESCRIPTION OF THE DRAWINGS

FIG. 9A to FIG. 9C are diagrams for explaining a wiping operation of the maintenance mechanism;

DESCRIPTION OF THE EMBODIMENTS

Hereafter, an explanation is given of the embodiments with reference to the accompanying drawings.

In the following description, "printing" indicates not only cases of forming meaningful information, such as characters and figures, that is, being meaningful or meaningless does not matter. Further, for "printing," whether or not being elicited in such a manner that a human can visually perceive does not matter, and cases of forming an image, design, pattern, or the like, on a print medium in a broad sense or cases of processing a medium are also indicated. Further, the "print medium" represents not only paper used in a general printing apparatus, but also, a cloth, plastic film, metal plate, glass, ceramics, wood, leather, and the like, or a material that can accept ink in a broad sense. Furthermore, "ink" (may be referred to as a "liquid") should be interpreted in a broad sense as with the above-described definition of "printing." Therefore, ink indicates liquids that are applied onto a print medium, so as to thereby serve for forming an image, a design, a pattern, etc., for processing a print medium, or for treating an ink (e.g., solidification or insolubilization of a coloring material in the ink applied to the print medium). In addition, unless otherwise specified, a "nozzle" collectively indicates an ejection port, a liquid path communicating therewith, and an element that generates energy utilized for ink ejection.

First Embodiment

<Configuration of the Printing Apparatus>

Figure 1:
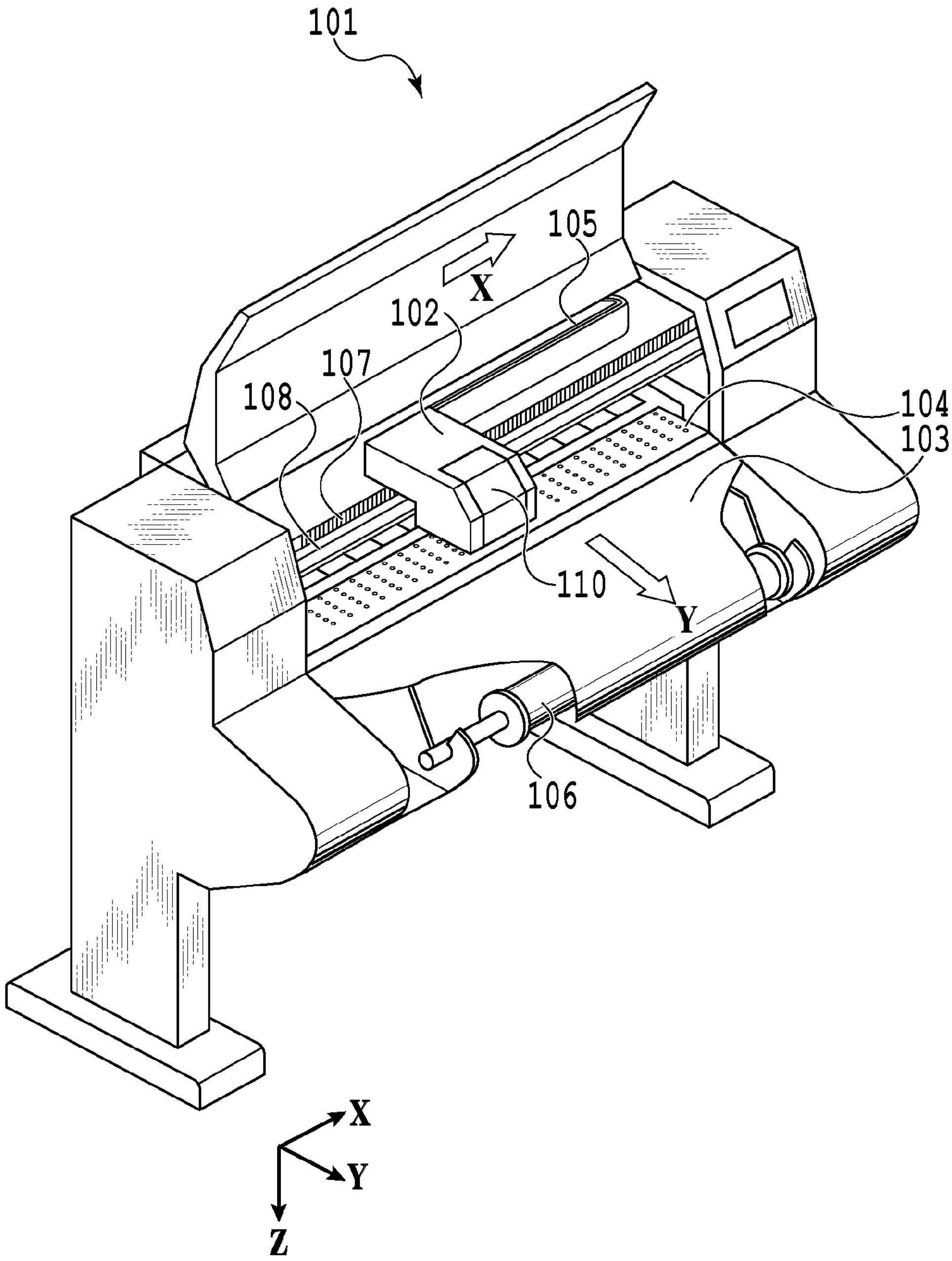
FIG. 1 is a perspective view of a printing apparatus.

FIG. 1 is a diagram illustrating the outer appearance of the inkjet printing apparatus (hereafter also simply referred to as a printing apparatus) according to the present embodiment. The printing apparatus 101 of the present embodiment is what is termed as a serial scanning type printer, which performs scanning with the print head 110 in the X direction (scanning direction) perpendicular to the Y direction (conveyance direction) in which the print medium 103 is conveyed, so as to print images. Note that the Z direction is a direction perpendicular to the X direction and the Y direction, and is a direction indicating the height. The X, Y, and Z directions are as described above also in the subsequent drawings.

With reference to FIG. 1, an explanation is given of the overview of the configuration of the printing apparatus 101 and the operation during printing. First, by a conveyance roller driven by the conveyance motor 309 (not illustrated in the drawings) via gears, the print medium 103 is conveyed in the Y direction from the spool 106 holding the print medium 103.

The fed print medium 103 is pinched and conveyed by a paper feeding roller and a pinch roller, and guided to a printing position (a scanning area of the print head 110) on the platen 104. On the other hand, at a predetermined conveyance position, the carriage motor 310 (not illustrated in the drawings) causes the carriage unit 102 to perform reciprocal scanning (reciprocal movement) in the X direction along the guide shaft 108 extending in the X direction. The print head 110 is mounted on the carriage unit 102. Furthermore, during this scanning flow, an ejection operation is performed from nozzles (ejection ports) of the print head 110 at a timing based on a positioning signal obtained by the encoder 107, so that printing of a constant bandwidth corresponding to the arrangement range of the ejection ports is performed. Thereafter, the print medium 103 is conveyed, and the printing of the next bandwidth is further performed. In this way, by alternately performing the conveyance of the print medium 103 and the print scanning by the print head 110, a desired image is printed on the print medium 103.

<Configuration of the Print Head>

Figure 2:
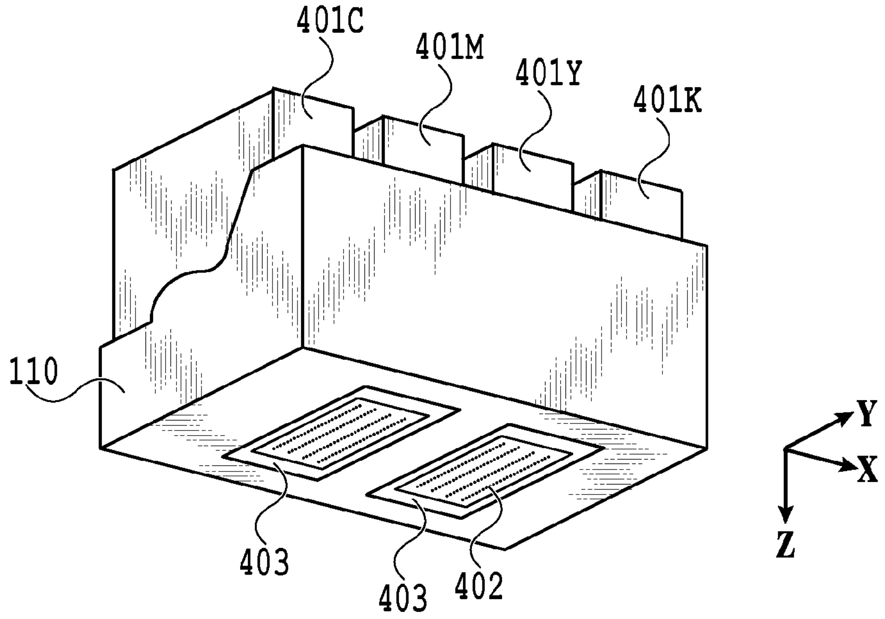
FIG. 2 is a schematic view of a print head.

FIG. 2 is a diagram illustrating an example of the configuration of the print head 110 and ejection port groups. The print head 110 in the present embodiment is equipped with independent buffer tanks 401C, 401M, 401Y, and 401BK corresponding to four colors of ink, i.e., cyan, magenta, yellow, and black. Note that, although the buffer tanks are illustrated so as to be visually recognizable in FIG. 2 for the sake of explanation, the buffer tanks are stored inside the print head 110. On the lower surface (+Z direction) of the print head 110, the chips 403, in which ejection port arrays corresponding to the respective inks are formed, are arranged. On the chips 403, two arrays of 1024 ejection ports 402 are formed and arranged side by side at an interval of 1200 dpi for each color, so that one chip can eject two colors. By arranging two of such chips 403, four-color printing is possible. Note that ejection port arrays for one color need not be arranged on the same straight line and may be alternately arranged one by one, so that a total of four arrays of 512 ejection ports are arranged at intervals of 600 dpi.

Figure 3:
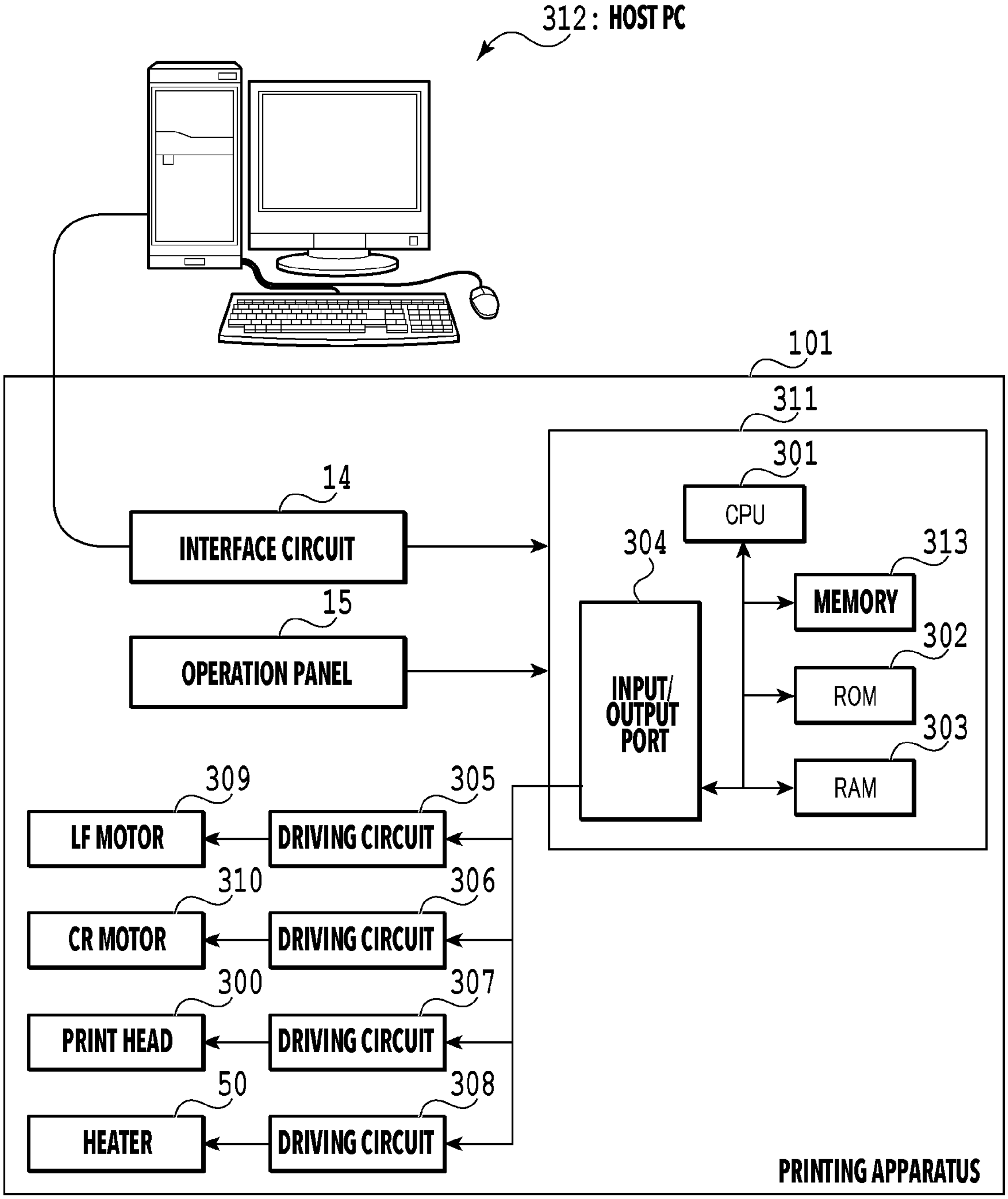
FIG. 3 is a diagram illustrating a printing control system of the printing apparatus.

FIG. 3 is a block diagram illustrating the overall configuration of a control system of the printing apparatus 101 in the present embodiment. The main control unit 311 has a CPU 301, a ROM 302, a RAM 302, a memory 313, and an input/output port 304. The CPU 301 executes processing operations, such as calculation, selection, determination, or controlling, or printing operations. The ROM 302 stores control programs, etc., to be executed by the CPU 301. The RAM 303 is used as a buffer for print data, etc. The memory 313 stores mask patterns, etc. The input/output port 304 is connected to the LF motor (conveyance motor) 309, the CR motor (carriage motor) 310, the print head 110, the heater 50, and the respective driving circuits 305 to 308, such as actuators in a cutting unit. Further, the input/output port 304 is connected to a recovery processing device (see FIG. 7) or a maintenance mechanism (see FIG. 7). Further, via the interface circuit 14, the input/output port 304 can be connected to the PC 312, which is a host computer.

<Data Processing Flow>

Figure 4:
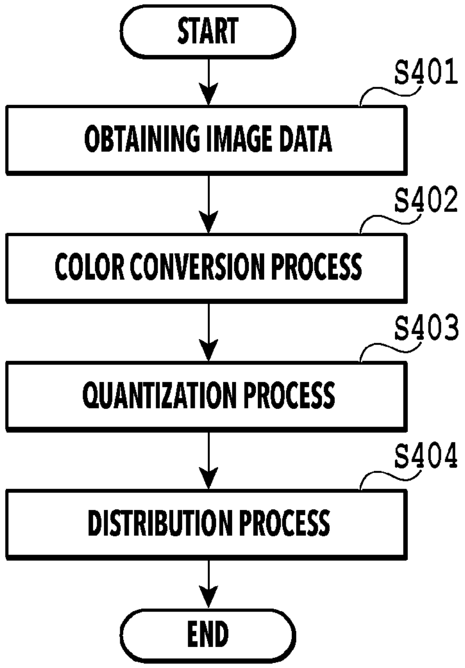
FIG. 4 is a diagram illustrating the flow of data processing.

FIG. 4 is a flowchart of print data generation processing to be executed by the CPU 301 according to a control program in the present embodiment. The series of processes illustrated in the present flowchart is performed by the CPU 301 of the printing apparatus 101 loading a program code stored in the ROM 302 into the RAM 303 and executing the code. Note that "S" in the explanation of each process below means that it is a step in the flowchart, and the same applies to the following embodiments.

First, in S401, the CPU 301 obtains image data (luminance data) represented by 8-bit 256-value information (0 to 255) for each color of red (R), green (G), and blue (B), which is input from the host PC 312 to the printing apparatus 101.

Next, in S402, the CPU 301 converts the image data represented by R, G, and B into multi-valued data represented by the multiple types of ink (K, C, M, Y) used for printing. By this color conversion process, multi-valued data, which is represented by 8-bit 256-value information (0 to 255) that defines the tone of each ink in each pixel group consisting of multiple pixels, is generated.

Next, in S403, the CPU 301 executes quantization of the multi-valued data represented by K, C, M, and Y, so as to generate quantized data (binary data) represented by 1-bit binary information (0, 1), which defines ejection or non-ejection of each ink for each pixel. Here, the quantization process can be performed according to various quantization methods such as an error diffusion method, a dither method, an index method, and the like.

In S404, the CPU 301 performs a distribution process for distributing the quantization data for multiple times of scanning to be performed on a unit area of the print head. By this distribution process, print data represented by 1-bit binary information (0, 1) that defines ejection or non-ejection of each ink for each pixel in each of the multiple times of scanning to be performed on a unit area of the print medium is generated. This distribution process corresponds to the multiple times of scanning and is executed by the use of a mask pattern that defines allowance or no allowance of ink ejection for each pixel.

Ink is ejected from the print head according to the print data generated as described above. Note that, although the form in which the CPU 301 of the printing apparatus 101 executes all of the processes as described above, embodiments in other forms are also possible. For example, such a form in which the processes are executed by the PC 312 is also possible. Further, for example, such a form in which a part of the processes is executed by the PC 312 and the rest is executed by the printing apparatus 100 is also possible.

<Ink Circulation Configuration>

Figure 5:
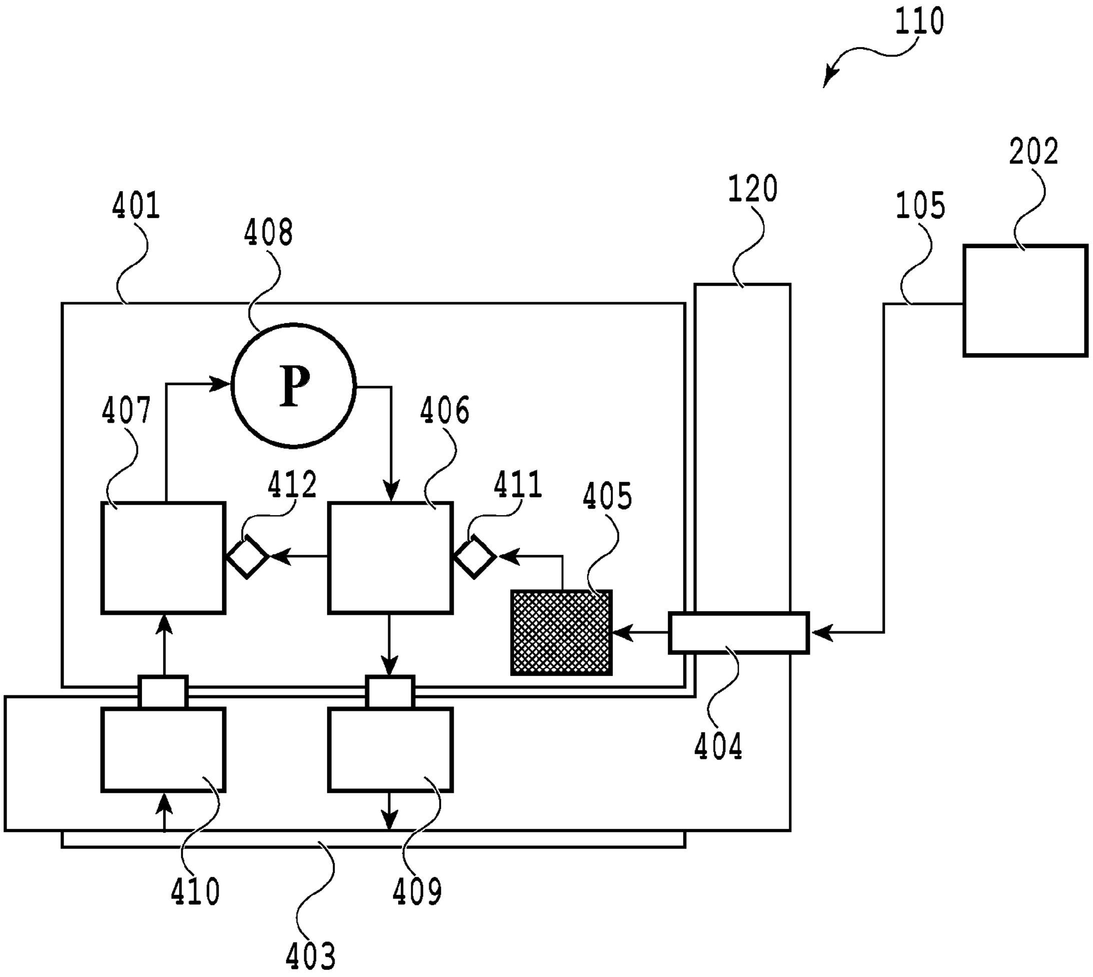
FIG. 5 is a diagram illustrating a circulation form of an ink circulation channel.

Next, with reference to FIG. 5, an explanation is given of a method of supplying ink to the print head 110 and the buffer tanks 401 and a method of circulating ink within ejection ports in the present embodiment. The ink is pressurized and reaches the inside of the print head 110 via the supply tube 105 from the ink tank 202, passes through the filter 405, and flows into a channel in front of the valve 411, which is arranged at an inlet port of the first pressure control member 406. In a state where the inside of the print head is filled with ink under an appropriate negative pressure so that the meniscus is maintained on the ejection port surface, the valve 411 arranged at the inlet of the first pressure control member 406 is closed, so the ink does not flow into the first pressure control member 406. On the other hand, if the negative pressure of the first pressure control member 406 increases in a case when a strong negative pressure is applied to the ejection ports 402 by a suction operation using the cap 211 of the recovery processing device 61 or in a case when ink is ejected from the ejection ports 402, etc., the valve 411 of the inlet port opens. Then, the ink flows into the first pressure control member 406.

As illustrated in FIG. 5, the first pressure control member 406 and the second pressure control member 407 are connected to the circulation drive pump 408. If the circulation drive pump 408 is driven, ink is transferred from the second pressure control member 407 to the first pressure control member 406 via the circulation drive pump 408. Accordingly, the negative pressure of the second pressure control member 407 increases and the valve 412 at the inlet port of the second pressure control member 407 opens, and, thus, the ink is made to flow back from the first pressure control member 406 to the second pressure control member 407. Further, here, a pressure difference occurs between the first pressure control member 406 and the second pressure control member 407, and, thus, an ink flow passing through the ejection ports 402 is generated. That is, from the first pressure control member 406, the ink passes through the channels in the order of the common supply channel 409, the opening 441 of the cover plate 440, the supply channel 431 of each ejection port array, and the inlet port 421, and some of the ink flows to the ejection ports 402. Further, from the ejection ports 402, the ink passes through the channels in the order of the outlet port 422, the collecting channel 432, the opening 441 of the cover plate 440, and the common collecting channel 410, so as to be collected by the second pressure control member 407. That is, the ink in the chip 403 flows in the directions of the arrows illustrated in FIG. 5. Note that the negative pressure and the ink flow velocity inside the ejection ports 402 are adjusted so as to be in a range to maintain the meniscus. That is, the negative pressure and the ink flow velocity inside the ejection ports 402 are adjusted by adjusting the flow rate of the circulation drive pump 408, the pressure loss in the channels between the first pressure control member 406 and the second pressure control member 407, and the opening/closing force of the valve at the inlet port.

As described above, by driving the circulation drive pump 408, a flow of moving the ink in the vicinity of the ejection ports 402 is generated, so that an increase in ink viscosity due to drying in the ejection ports during printing operations is suppressed, and, thus, deterioration in ink ejection characteristics can be suppressed.

Figure 6A:
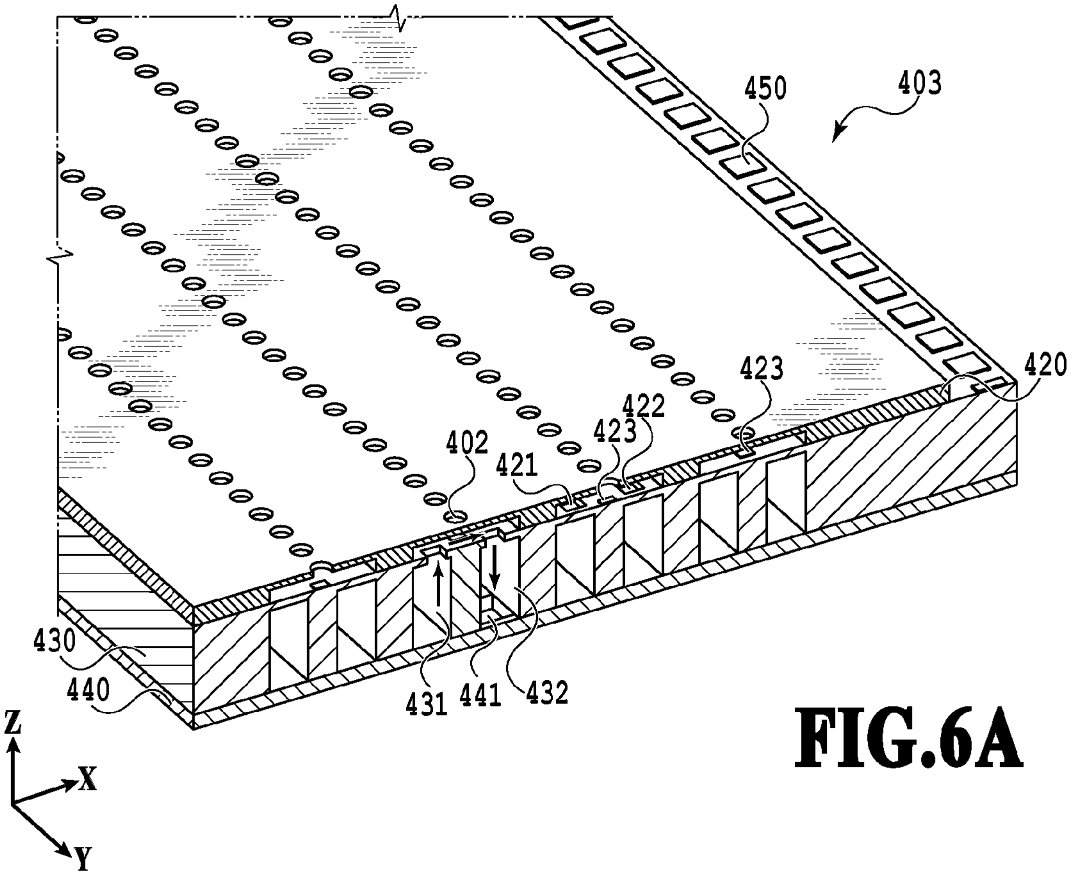
FIG. 6A and FIG. 6B are diagrams illustrating the configuration of ejection ports and channels formed in a chip.
Figure 6B:
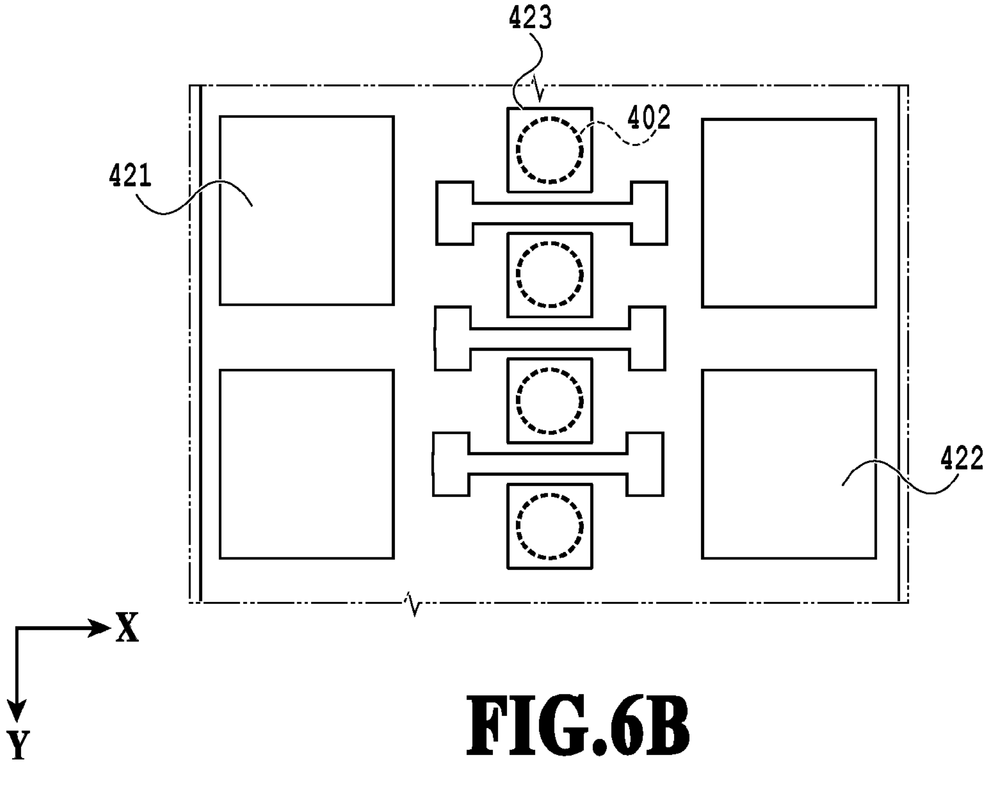

FIG. 6A and FIG. 6B are diagrams illustrating the configurations of the ejection ports, channels formed in the chip 403, and the flow of ink. FIG. 6A and FIG. 6B are diagrams for explaining the chip 403. FIG. 6A is a diagram illustrating the configurations of the ejection port 402, channels formed in the chip 403, and the flow of ink. Further, FIG. 6B is a schematic diagram of the bottom surface (the surface on which the ejection port 402 is arranged) of the chip 403. Here after, with reference to FIG. 6A and FIG. 6B, an explanation is given of the configurations of the ejection port 402, channels formed in the chip 403, and the flow of ink. The ejection port 402 is formed in the orifice plate 420 on the surface of the chip 403. At a position (pressure chamber) corresponding to the ejection port 402 on the base plate 430, the ejection energy generating element 423 that generates the ejection energy for ejecting ink is installed. That is, the ejection energy generating element 423 is installed so as to correspond to each ejection port 402. As the ejection energy generating element 423, an electrothermal conversion element (heater), a piezoelectric element, or the like, can be used. In a case of using a heater, the generated heat causes the ink in the ejection port 402 to bubble, and the ink can be ejected from the ejection port 402 by utilizing the bubbling energy.

In the state where ink is supplied, the chip 403 is kept at such a negative pressure in which a meniscus is formed on the ejection port surface. Two channels, i.e., the inlet port 421 and the outlet port 422, are formed on both sides of the ejection port 402, respectively. In the present embodiment, each of the inlet port 421 and the outlet port 422 is arranged so as to correspond to two of the ejection ports 402 as illustrated in FIG. 6B. Note that, regarding the numbers of inlet ports 421 and outlet ports 422, it is also possible that each of them is arranged for one ejection port 402. It is also possible that each of them is arranged for more than two ejection ports 402. Further, the numbers of inlet ports 421 and outlet ports 422 do not have to match. As illustrated in FIG. 6A, the inlet port 421 and the outlet port 422 are respectively connected to the supply channel 431 and the collecting channel 432, which are respectively formed along the ejection port array direction (Y direction). The supply channel 431 and the collecting channel 432 are covered with the cover plate 440 and connected to the common supply channel 409 and the common collecting channel 410 of the head main body 120 via the openings 441 on the cover plate. One or more openings 441 are installed for each of the supply channel 431 and the collecting channel 432. Note that the number of openings 441 may be the same or different for the supply channels and the collecting channels.

<Recovery Mechanism and Maintenance Mechanism>

Figure 7:
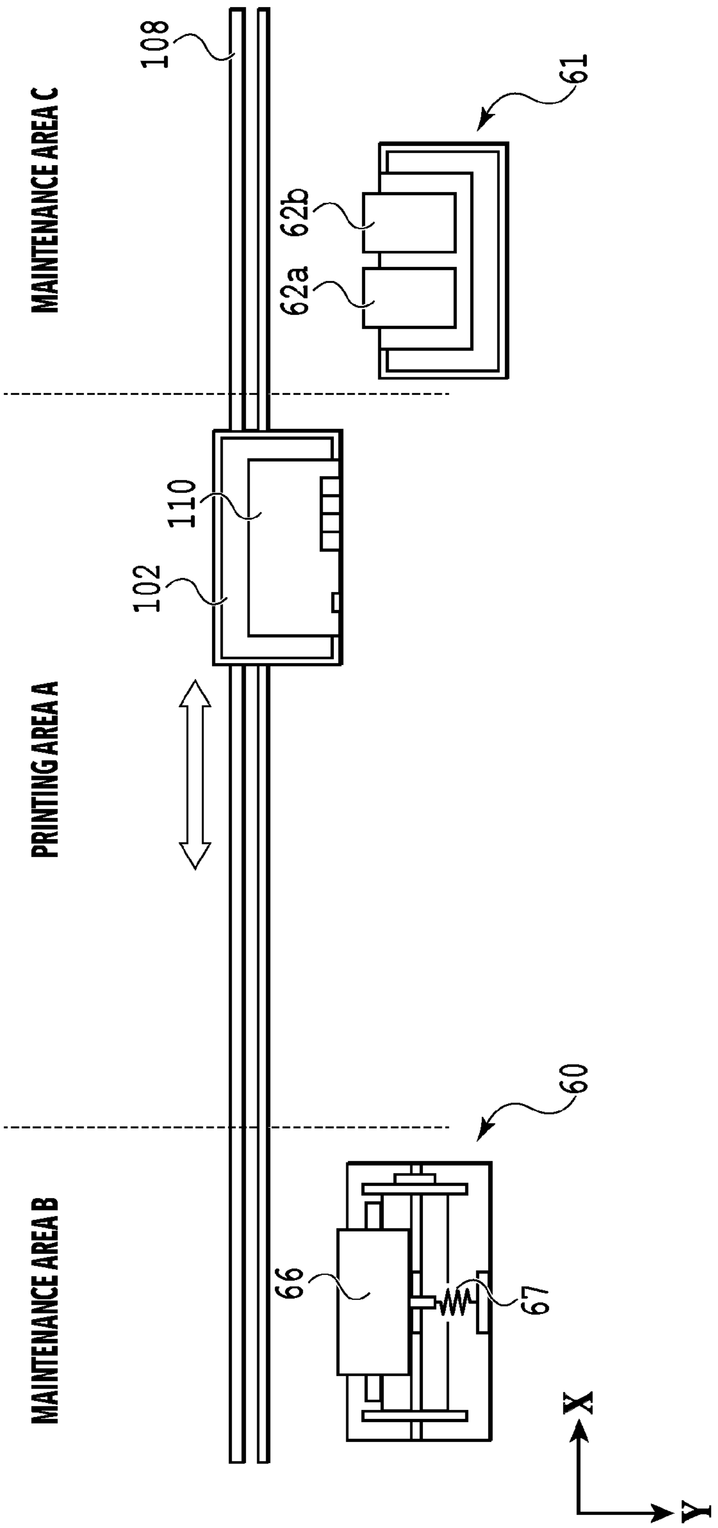
FIG. 7 is a diagram for explaining a maintenance mechanism and a recovery processing device.

FIG. 7 is a diagram illustrating the maintenance mechanism 60 and the recovery processing device 61 installed in the inkjet printing apparatus according to the present embodiment. The maintenance mechanism 60 and the recovery processing device 61 are installed so as to face the print head 110, and the carriage on which the print head is installed and supported by the guide shaft 108 moves to the maintenance mechanism and the recovery device, based on signals of the encoder 107. First, an explanation is given of the recovery processing device 61.

The recovery processing device 61 illustrated in FIG. 7 is arranged in the maintenance area C, which is adjacent to the printing area A. The printing area A is a position where the ejection ports 402 of the print head 110 face the print medium supported by the platen 104. On the other hand, the maintenance area C is adjacent to one end of the printing area A. The recovery processing device 61 includes a suction recovery mechanism, an ascending/descending mechanism that ascends and descends the suction recovery mechanism, and a wiping unit, which are not illustrated in the drawings. Further, the suction recovery mechanism performs the suction recovery process. The suction recovery process referred to herein is a process of forcibly suctioning ink from multiple ejection ports formed in the print head 110 so as to thereby maintain the ink in the ejection ports in the state suitable for ejection. Specifically, the suction recovery mechanism has the caps 62*a* and 62*b*, which cover the ejection port surface, and a pump (not illustrated in the drawings), which communicates with the caps. The pump generates a negative pressure inside the caps, and the ejection ports are forcibly suctioned by the negative pressure.

Figure 8A:
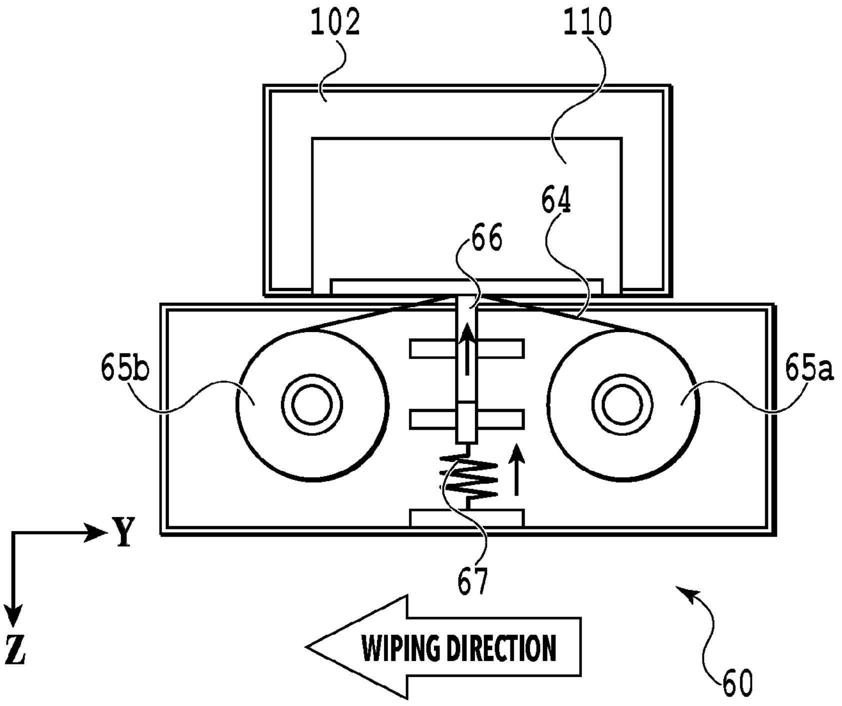
FIG. 8A and FIG. 8B are diagrams illustrating a cross-sectional view of the maintenance mechanism.
Figure 8B:
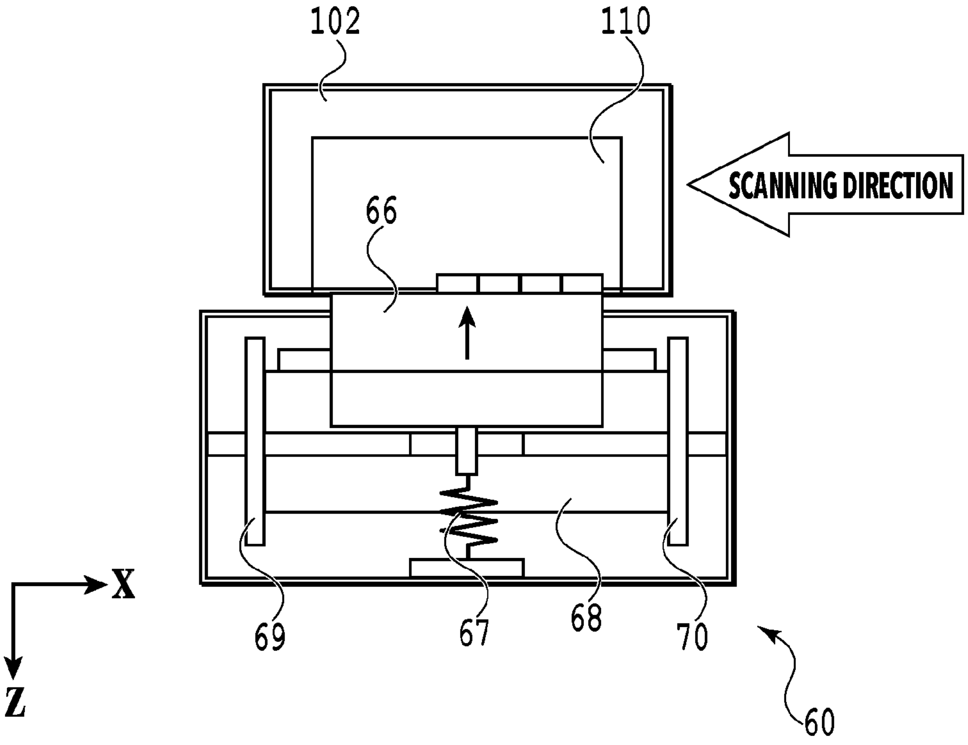

Next, an explanation is given of the maintenance mechanism 60. FIG. 8A and FIG. 8B are cross-sectional views of the maintenance mechanism 60 installed in the inkjet printing apparatus 101 according to the present embodiment. In FIG. 8A, a cross-sectional view of the maintenance mechanism in the case of viewing the printing apparatus 101 from a side (viewed from the −X direction in the X direction) is illustrated. The maintenance mechanism 60 illustrated in FIG. 8A is arranged in the maintenance area B adjacent to the other end of the printing area A. The maintenance mechanism 60 has the sheet-like cleaning member 64 capable of wiping off ink adhering to the ejection ports 402 of the print head 110. In the present embodiment, the cleaning member 64 includes an elongated sheet-like porous material and is pre-impregnated with a wiping liquid containing a low volatility solvent such as polyethylene glycol as a main component. Porous materials absorb and draw out ink from the ejection ports 402 at the time of wiping more easily than elastic materials do, and thus exhibit a greater effect. Hereinafter, the cleaning member 64 is also referred to as a “sheet member”.

The cleaning member 64 in an unused condition (before ink is wiped off) is wound around the rotary member 65*a* (the first rotary member). The rotary member 65*b* (second rotary member) is arranged on the downstream side relative to the rotary member 65*a* in the conveyance direction (F) of printing paper. The tip of the cleaning member 64 is attached to the rotary member 65*b*, so that the cleaning member 64 in a used condition (ink has been wiped off) is wound around the rotary member 65*b*. The pressing member 66 is arranged between the rotary member 65*a* and the rotary member 65*b*. The pressing member 66 presses the cleaning member 64 upward with a constant load by use of the compression spring 67. The pressing position is a position where the pressing member 66 pushes up the cleaning member 64 so that a part thereof makes contact with the ejection ports 402. In the present embodiment, the length of the cleaning member 64 that is made to abut on the ejection ports 402 by the pressing member 66 is about 5 mm in the ejection port array direction (that is, the wiping direction), which is the length that simultaneously abuts on about 240 ejection ports per color.

FIG. 8B is a cross-sectional view of the maintenance mechanism installed in the inkjet printing apparatus according to the present embodiment, i.e., a cross-sectional view of the maintenance mechanism 60 in a case when the printing apparatus 101 is viewed from the front (viewed from the Y direction in the −Y direction). With the rotary member 65*b* illustrated in FIG. 8B, the cleaning member 64 in a used condition is wound around the outer peripheral surface of the core part 68, while the core part 68 is rotating in the same direction as that of the rotary member 65*a*. The pair of circular members 69 and 70 are installed on both end sides of the core part 68. The circular members 69 and 70 are configured to have an outer diameter greater than the outer diameter of the core part 68. Note that, for the sake of explanation, the core part 68 is illustrated as being transparent.

In general, the particle size of coloring materials, such as pigment contained in a pigment ink used in the printing apparatus 101, is about 20 nm to 30 nm. On the other hand, the cleaning member 64 of the present embodiment is configured with a non-woven fabric (a sheet web or a pad-like material made by bonding or entangling fibers by melt-adhesion or mechanical or chemical action). Further, because of the capillary pressure of the fine pores of the cleaning member 64, the ink adhering to the ejection port array forming surface is instantaneously absorbed by the wiping operation with the cleaning member 64.

<Wiping Operation>

Here after, an explanation is given of the wiping operation of the maintenance mechanism 60 in the present embodiment. Here after, ink ejection that is not associated with image formation on a print medium is referred to as preliminary ejection.

Conventionally, in wiping operations performed during ink circulation, there has been a possibility that mist of another color in the vicinity of an ejection port or bleeding from an adjacent ink onto a cleaning member enters an ejection port and deep inside of the ejection port, which results in a color mixture. This is because, although the cleaning member 64 is wound before a wiping operation so that the area that abuts the ejection port surface is renewed with a new surface, since all of the ejection port arrays are wiped with the same surface during the wiping operation, ejection ports on the downstream side of the wiping operation are wiped with the surface that has been soiled with ink including other colors. Inks of other colors that are mixed deep inside the ejection ports 402 cannot be easily discharged even by preliminary ejection after the wiping. On the other hand, if the wiping is performed after the ink circulation is stopped, the color mixture is suppressed, but such a problem that a drop in throughput occurs.

Therefore, in the present embodiment explained below, the enhancement of wiping accuracy is considered, i.e., by performing the wiping operation and the winding operation of the cleaning member 64 together, the wiping operation is performed while the area that abuts the ejection port surface is renewed with a new surface. By performing the winding operation at an appropriate timing, it is expected to improve productivity while suppressing color mixture. For example, there is such a timing as after ink circulation is stopped, at which a color mixture can be prevented, even if wiping is performed without performing the winding operation together. If the winding operation is performed at such a timing, the consumption amount of the cleaning member 64 increases, although the accuracy of the wiping of the surface after ejection is not much different from the case of not performing the winding operation together. An explanation is given below of a method of reducing the consumption amount of the cleaning member 64, while suppressing a color mixture in consideration of the winding of the cleaning member 64 at an appropriate timing and by an appropriate winding length.

Figure 10:
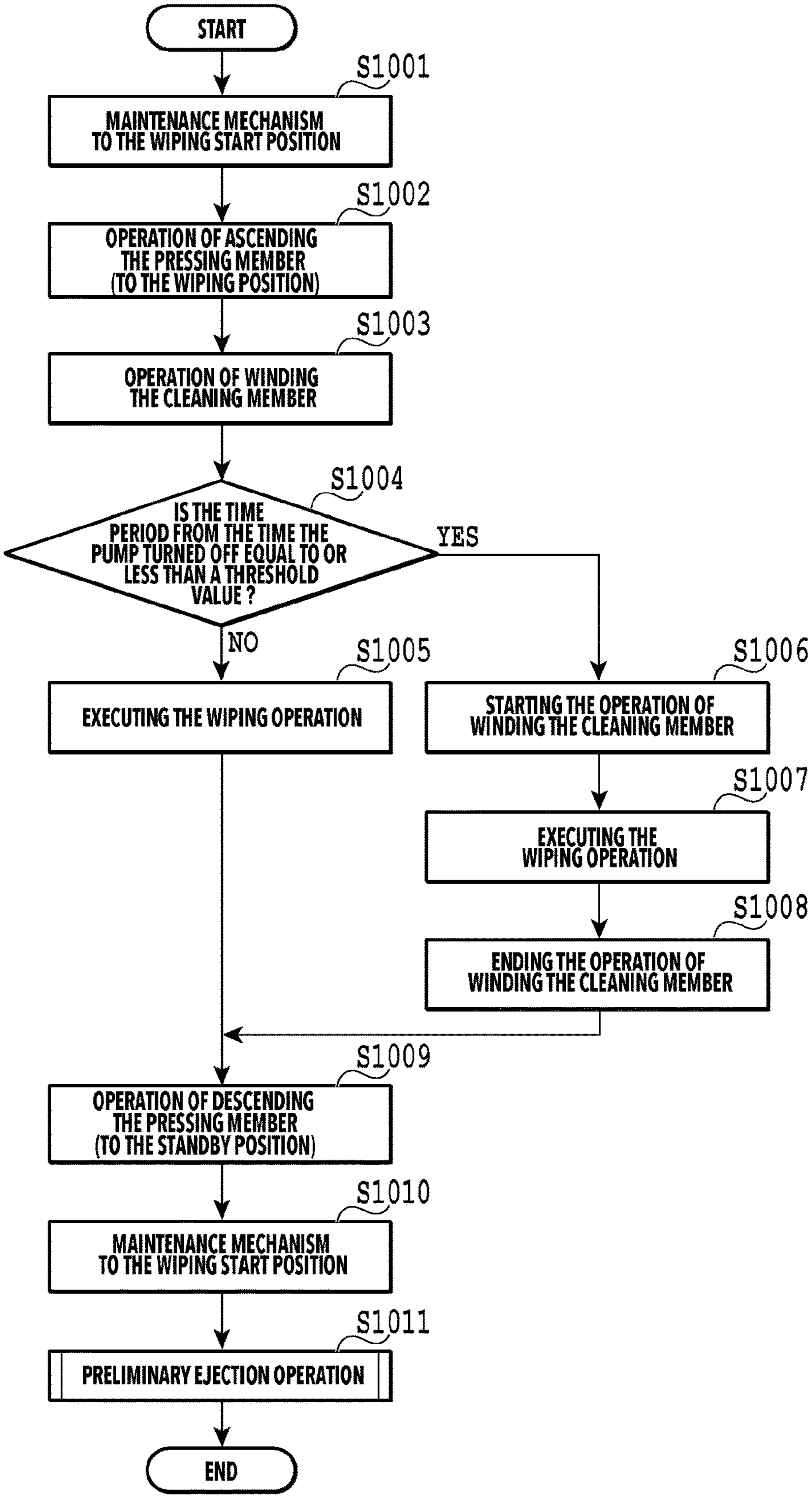
FIG. 10 is a diagram illustrating a processing flow of the maintenance mechanism.

FIG. 9A to FIG. 9C are diagrams illustrating the flow of the wiping operation of the maintenance mechanism 60 included in the printing apparatus 101. Further, FIG. 10 is a diagram explaining the flow. The wiping operation of the maintenance mechanism 60 is explained with reference to FIG. 9A to FIG. 9C and FIG. 10. The processes illustrated in FIG. 10 are performed by the CPU 301 executing and controlling a program stored in the memory 313, or the like. Note that the subject of the processes of FIG. 10 is assumed to be the printing apparatus 101.

First, in S1001, the printing apparatus 101 moves the carriage unit 102 from the printing area A to the non-printing area B as illustrated in FIG. 7. Then, the maintenance mechanism 60 is moved to the wiping start position, i.e., the position illustrated in FIG. 7A.

In S1002, the printing apparatus 101 performs the operation of ascending the pressing member 66. In S1003, the printing apparatus 101 winds the cleaning member 64 by a predetermined length, so as to renew the area to be pressed against the ejection port forming surface by the pressing member 66 with a new surface. In the present embodiment, winding by about 5 mm, which is the length for the cleaning member to abut the ejection port arrays in the wiping direction, is performed for each wiping operation.

In S1004, the printing apparatus 101 compares the elapsed time from the time the circulation drive pump 408 illustrated in FIG. 5 is stopped with a predetermined threshold value. This threshold value is a value that defines the boundary of time period in which color mixture can be prevented, even if the ejection port surface is wiped in response to the stopping of the circulation drive pump 408 without performing the winding operation. Being greater than the threshold value represents that a time period has passed since the circulation drive pump 408 is stopped, so that the circulatory flow of ink has slowed down. On the other hand, being equal to or less than the threshold value represents that a sufficient time period has not passed since the circulation drive pump 408 is stopped, so that the circulatory flow of ink is fast. In a case when the elapsed time from stopping the circulation drive pump 408 is greater than the threshold value in the determination of S1004, the printing apparatus 101 executes the wiping operation in S1005. Since the wiping operation in S1005 is performed in a state where the circulatory flow is slow or stopped as described above, even without performing the winding operation, the ejection port surface can be wiped such that color mixture is prevented. Therefore, the wiping is performed without performing the winding operation together. In FIG. 9B, the state, in which the maintenance mechanism 60 is performing the wiping operation so that the cleaning member 64 wipes off the ink adhering to each ejection port array of the print head 110, is illustrated. In FIG. 9C, the further-progressed state, in which the cleaning member 64 has finished wiping the print head and the cleaning member 64 is separated from the print head, is illustrated. The flow from FIG. 9A to FIG. 9C is the wiping operation, which corresponds to S1005 of FIG. 10.

On the other hand, in the determination of S1004, in a case when the time period, since the circulation drive pump 408 is stopped, is equal to or less than the threshold value, there is a possibility that color-mixed ink is flowed from an ejection port deep into the part due to the circulatory flow of ink. Therefore, in S1006, the printing apparatus 101 starts the winding operation of the cleaning member 64 and, in S1007, performs the wiping operation together with the winding operation. Accordingly, it is possible to perform the wiping operation in a state where the area to be pressed against the ejection port forming surface by the pressing member 66 is always renewed with a new surface. That is, suppression of a color mixture can be expected. In S1008, the printing apparatus 101 ends the winding operation of the cleaning member 64 at the timing when the wiping operation ends.

An explanation is given of the processes of S1006 to S1008 with reference to FIG. 9A to FIG. 9C. In FIG. 9A to FIG. 9C, while the cleaning member 64 is wiping off the ink adhering to each ejection port array of the print head 110, the cleaning member 64 in a used condition (which has wiped off ink) is wound by the rotary member 65*b*. Here, the winding by about 25 mm, which is the length of the ejection port arrays of the print head, is performed for each wiping operation. After the wiping operation is completed and the maintenance mechanism 60 is moved, as illustrated in FIG. 9C, the printing apparatus 101 descends the pressing member 66. By descending the pressing member 66 to the standby position, even if the print head 110 is above the maintenance mechanism 60, the maintenance mechanism 60 can be moved without interference between the pressing member 66 and the ejection port forming surface.

In S1010, the printing apparatus 101 moves the maintenance mechanism 60 to the wiping start position. In S1011, the printing apparatus 101 performs preliminary ejection. Preliminary ejection may be performed on the cap or may be performed on the cleaning member 64, or a preliminary ejection box that receives only preliminary ejection may be installed. Then, the series of wiping operations ends.

Next, an explanation is given of the preliminary ejection operation in S1011.

Figure 11:
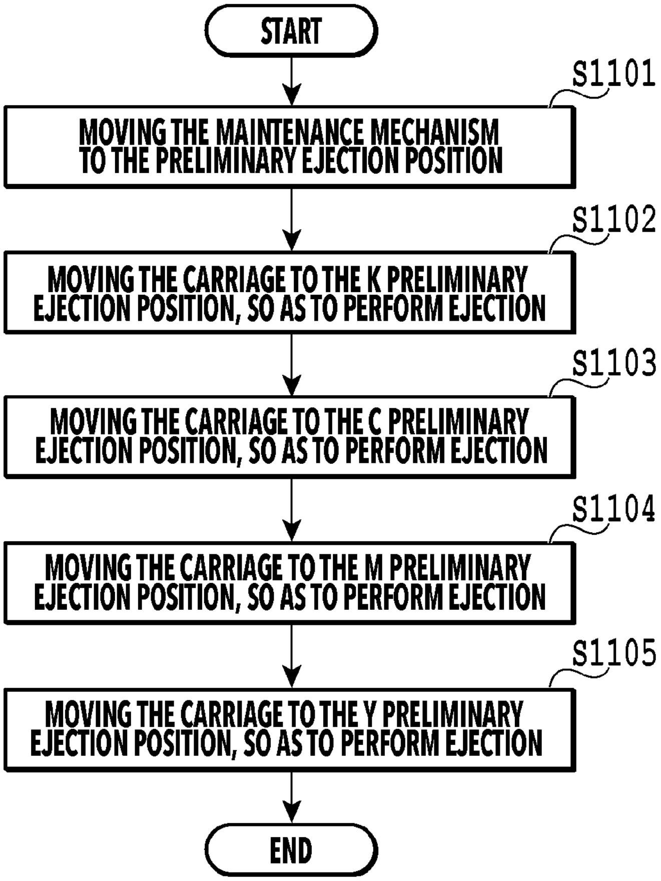
FIG. 11 is a diagram illustrating a processing flow of a preliminary ejection operation of the maintenance mechanism.

FIG. 11 is a diagram explaining the flow of the preliminary ejection operation. In S1101, the maintenance mechanism of the printing apparatus 101 moves to the preliminary ejection position on the cleaning member 64.

Figure 12:
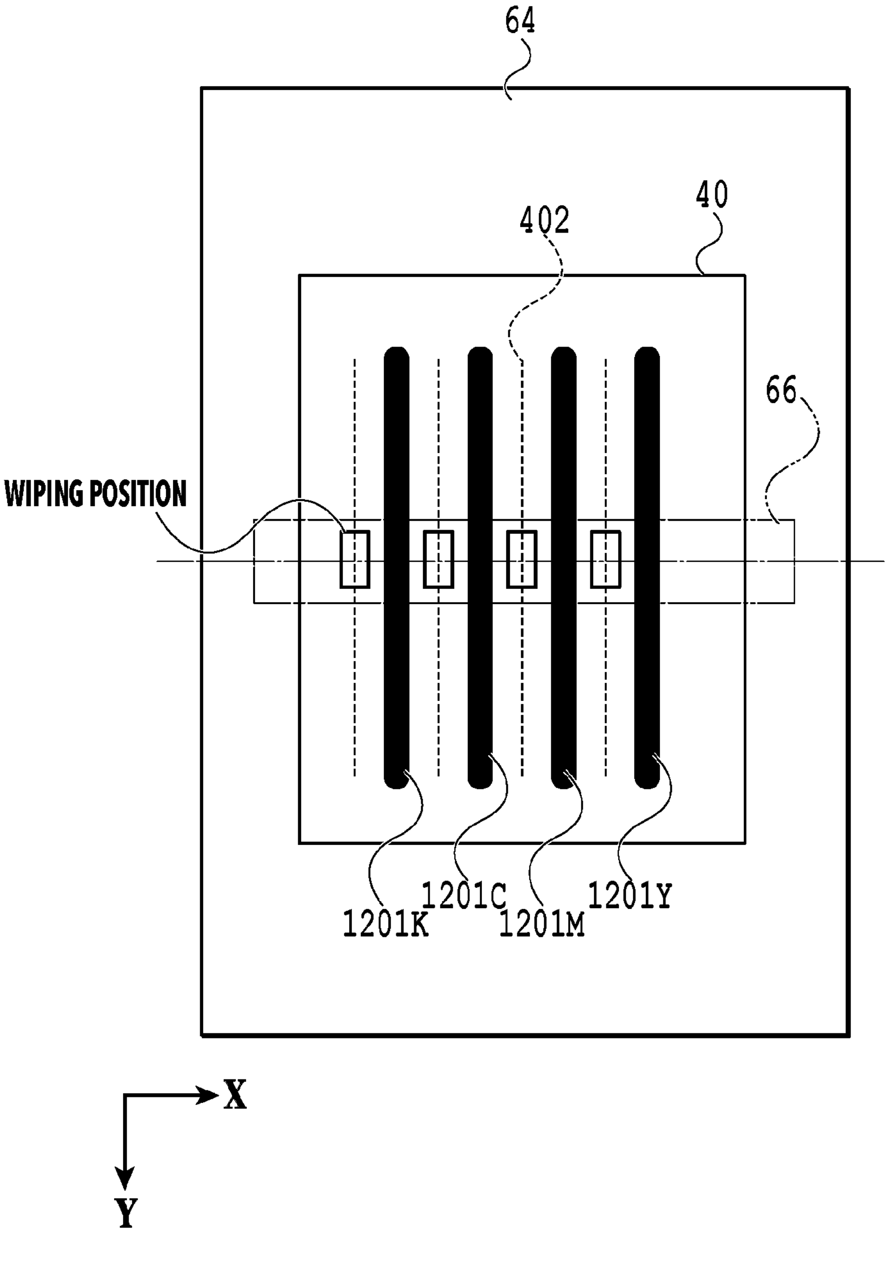
FIG. 12 is a diagram illustrating a preliminary ejection position of the maintenance mechanism.

FIG. 12 is a schematic diagram illustrating the preliminary ejection position of the maintenance mechanism 60 after wiping. As illustrated in FIG. 12, the preliminary ejection operation of the present embodiment is performed at a location where the center position of the pressing member 66 matches the center position of the ejection port arrays.

The dashed line in FIG. 12 is a perspective view of seeing the position of the print head at the time of performing the wiping operation, which is illustrated in S1003 of FIG. 10, from above the maintenance mechanism 60. Here, the wiping operation is performed in the area where the cleaning member 64 pressed by the pressing member 66 makes contact with the respective positions of the ejection port arrays.

Therefore, preliminary ejection is performed at each of the preliminary ejection positions 1201K, 1201C, 1201M, and 1201Y, where the carriage unit 102 is moved so that the preliminary ejection is performed at positions between ejection port arrays, i.e., positions different from the positions that make contact with the ejection port arrays in the wiping operation. That is, in S1102 to S1105, the printing apparatus 101 moves to the preliminary ejection positions in the order of 1201K, 1201C, 1201M, and 1201Y, so as to perform preliminary ejection. In the present embodiment, preliminary ejection of one hundred shots per ejection port is performed at a driving frequency of 5 kHz. Note that the preliminary ejection need not be performed in the above-described order of the preliminary ejection positions. Furthermore, the preliminary ejection may not be performed on the pressing member 66 and may be performed on the cleaning member 64 in a used condition (which has wiped off ink).

Next, an explanation is given of the timing at which the wiping operation explained with reference to FIG. 9A to FIG. 9C and FIG. 10 is performed. In the present embodiment, the wiping operation is performed at the start of printing, during a printing operation, between pages, before a cap closing operation, or during a cleaning sequence.

The wiping operation during a printing operation is performed as a maintenance on a regular basis for preventing the mist of the same color or different colors from the print head, which occurs during printing operations, from adhering and sticking to the vicinity of ejection ports or for preventing a large amount of mist from congregating to form a liquid droplet and dripping.

The wiping operation at the start of a printing operation is performed before the printing of the first page and is performed for the purpose of preliminarily applying a wiping liquid impregnated in the cleaning member to the head orifice face, so as to make it easier to remove mist that will adhere later by the wiping operations during the printing operation. Further, the wiping operation during a cleaning sequence is also performed for preliminarily applying the wiping liquid impregnated in the cleaning member to the head orifice face after a recovery process, such as ink suctioning with the cap, is performed.

The wiping operation at the start of a printing operation or during a cleaning sequence is performed in a state where there is no "ink circulatory flow," that is, after a sufficient time period has passed since the circulation drive pump 408 is stopped. Therefore, even if wiping is performed with a surface that has already been soiled with ink, the color-mixed ink remains in the vicinity of ejection ports and, thus, can be discharged by preliminary ejection. That is, it is not necessary to perform the wiping operation while performing the winding operation.

A wiping operation between pages is performed as necessary during a multiple page printing operation. The timing of the wiping operation is, for example, the timing after the end of the printing of the first page and before the printing of the second page and, in some cases, the timing at which cutting is performed by a cutter process after the printing of the first page ends. Further, the wiping operation before a cap closing operation is a wiping operation for performing maintenance before capping the print head 110 after the end of printing. The wiping operations between pages and before the cap closing operation are performed in a state where the elapsed time from the time the circulation drive pump 408 is stopped is short (for example, shorter than the time period represented by the threshold value used in S1004 of FIG. 10), i.e., in a state where the circulatory flow of ink is fast. Depending on the velocity of the ink circulatory flow, there is a difference in how deep the color-mixed ink entering an ejection port through the vicinity thereof flows. In the present embodiment, the ink circulatory flow during the wiping operation between pages is faster than the ink circulatory flow during the cap closing operation, for example, and thus there is a possibility that the color-mixed ink flows deeper into the ejection port, which makes it impossible for the color-mixed ink to be discharged by preliminary ejection. In a case when the wiping operation is performed after waiting a sufficient time period from the time the circulation drive pump 408 is stopped, even if the wiping is performed with a surface that has already been soiled with ink, the color-mixed ink remains in the vicinity of ejection ports and thus can be discharged by preliminary ejection, but the throughput drops. Therefore, for a wiping operation between pages, it is desirable to perform a wiping operation to which the present embodiment is applied, i.e., a wiping operation performed together with a winding operation.

Figure 13A:
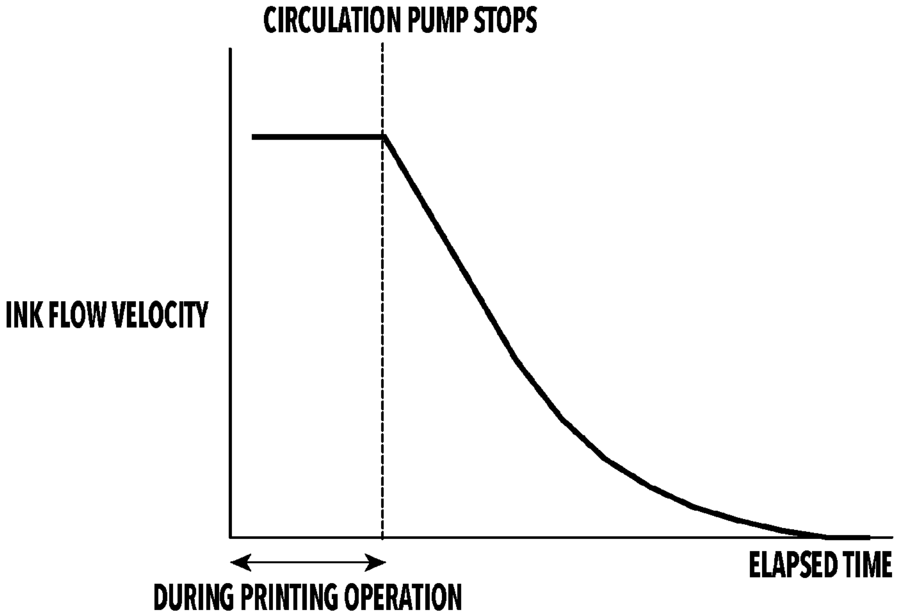
FIG. 13A and FIG. 13B are graphs illustrating ink flow velocity and winding length according to an elapsed time from the stop of a circulation drive pump.
Figure 13B:
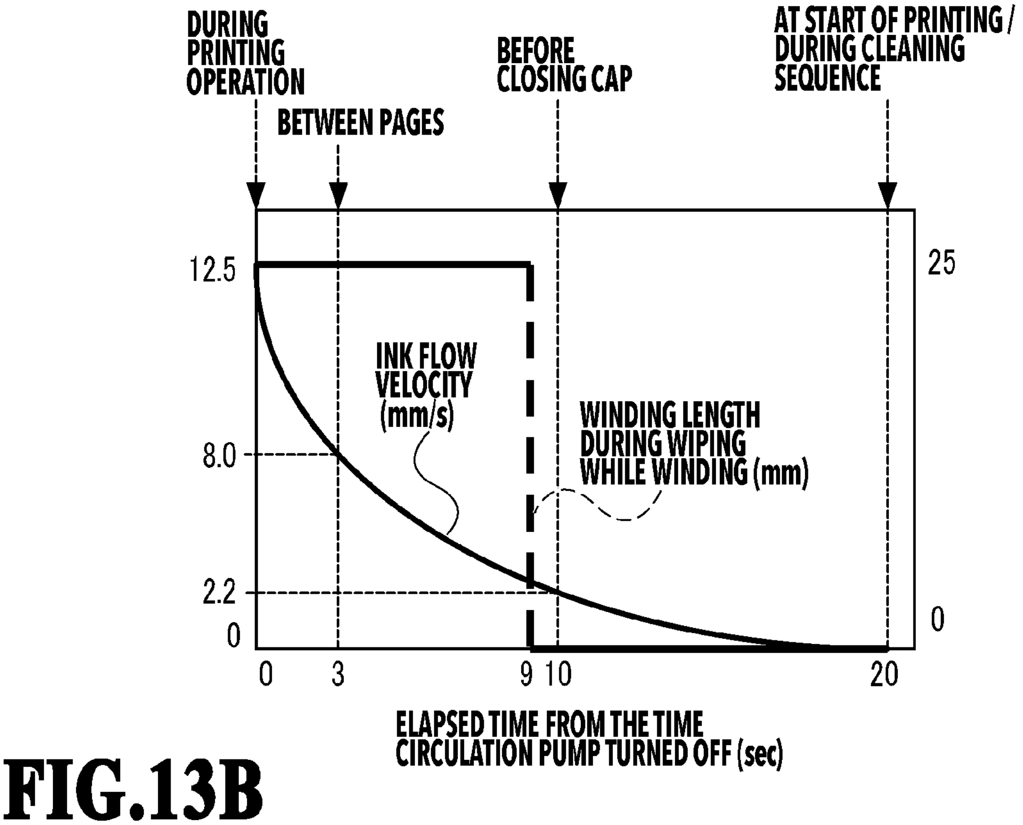

FIG. 13A and FIG. 13B are diagrams illustrating the relationship among the elapsed time since the circulation drive pump 408 is stopped, the ink flow velocity, and the winding length during wiping. FIG. 13A is a diagram illustrating the relationship between an elapsed time and ink flow velocity. The horizontal axis represents the elapsed time (sec), and the vertical axis represents the ink flow velocity (mm/s) of the "ink circulatory flow."

As described above, during the printing operation, the circulation drive pump 408 is driven for circulating the ink in the ejection ports so as to stabilize the ejection characteristics. Here, during the printing operation of FIG. 13A, it is assumed that ink ejection from the ejection ports is not performed, a constant pressure difference is generated between the first pressure control member 406 and the second pressure control member 407, and the ink flow velocity is also constant. In a case of ejecting ink, the negative pressures of the first and second pressure control members temporarily increase and the pressure difference changes. This is because the valve 411 of the inlet port of the first pressure control member 406 opens so that the ink is supplied from the ink tank 202 to the buffer tanks 401 and, thus, the original pressure state is restored.

If the printing operation ends, the print head 110 returns to the standby position and is capped after the necessary recovery operation is performed by the recovery processing device 61. After the printing operation ends, it is not necessary to circulate the ink in the ejection ports to suppress the increase in viscosity due to evaporation, and thus the driving of the circulation drive pump 408 is stopped at such a timing illustrated in FIG. 13A. However, the pressure difference remains between the first and second pressure control members, and the valve 412 at the inlet port of the second pressure control member is open immediately after the ink flow velocity of the ink generated by the driving of the pump disappears. Therefore, the ink continues to flow for a certain time period in the channels between the pressure control members and the channels going through the ejection ports. Since the pressure difference between the first and second pressure control members is gradually eliminated by the flow of ink, the valve 412 is closed and the ink flows through the nozzles, so that the flow velocity of the ink slows down accordingly and, after a certain time period, the flow velocity almost stops.

In a case of waiting for the wiping operation to be performed on the head orifice face by the cleaning member 64 of the maintenance mechanism 60 until the ink flow velocity stops after the circulation drive pump 408 stops, the problem of ink mixture or the problem that an foreign substance deeply enters a circulation path do not occur. However, because of the wait for the ink flow velocity to stop, the start of the wiping operation is delayed due to the standby time and, accordingly, the start of the printing operation for the next image to be printed is also delayed, and, therefore, the productivity of the printing apparatus is decreased.

On the other hand, if the wiping is performed in a state where the ink flow velocity remains, the problem that ink of another color enters an ejection port and flows deep into the print head 110 occurs. As for this color mixture, if the ink flow velocity is fast, the amount of color mixture is great, and the ink enters an ejection port deeply though the vicinity thereof and cannot be discharged even by preliminary ejection, and, if the ink flow velocity is slow, the amount of color mixture is low, and the ink does not enter an ejection port deeply through the vicinity thereof and can be discharged by preliminary ejection. Specifically, in view of the amount of color mixture and a discharge operation by preliminary ejection for each ink flow velocity, if the ink flow velocity is about 3 (mm/s) or less, ink does not enter the ejection ports deeply through the vicinities thereof and can be discharged by preliminary ejection. Note that this ink flow velocity is an example in the case of the print head of the present embodiment, and the allowable ink flow velocity may change as appropriate depending on the print head used, etc.

FIG. 13B is a diagram illustrating the relationship among an elapsed time from the time the circulation drive pump 408 stopped driving, ink flow velocity, and winding length in the case of winding the cleaning member 64 during the wiping operation. Further, in FIG. 13B, how long a time has elapsed since the stop of the circulation drive pump 408 at the timings when the above-described wiping operation is performed (during a printing operation, between pages, before closing the cap, at the start of printing, or during a cleaning sequence) is illustrated. Note that all of the above-described wiping operations (during a printing operation, between pages, before closing the cap, at the start of printing, or cleaning sequence) are not necessarily performed in one printing operation. In FIG. 13B, operation timing (elapsed time from the time the pump stopped driving) and winding length, in each case where any of the above-described wiping operations is performed, is described.

For example, the ink flow velocity during a printing operation and at the time the circulation drive pump 408 stops driving (0 (sec)) is about 12.5 (mm/s). Similarly, the wiping timing in the case of performing wiping between pages is a timing after the printing operation for the previous page ends and about 3.0 (sec) elapses from the time the circulation drive pump 408 is stopped, and the ink flow velocity is about 8.0 (mm/s). Similarly, before closing the cap, the ink flow velocity is about 2.2 (mm/s) at about 10.0 (sec) after the pump stops, and, during the cleaning sequence, the ink flow velocity is about 0 (mm/s) at about 20 (sec) or more after the pump stops. At start of printing, the ink flow velocity is about 0 (mm/s), as well, since it is before driving the circulation drive pump 408. It is known that the wiping during printing operations and between pages, in which ink flow velocity is faster than about 3 (mm/s), causes the problem of color mixture, and the wiping before closing the cap, at the start of printing, and during cleaning sequences, in which the ink flow velocity is slower than about 3 (mm/s), is not likely to cause the problem of color mixture.

Therefore, in a case when the wiping is performed at a timing earlier than the timing at which the ink flow velocity is about 3 (mm/s) or less, the operation is performed, while winding the cleaning member 64, so as to renew the part that abuts the ejection-performed surface as illustrated in S1006 to S1008 of FIG. 10. In the case of the present embodiment, the ink flow velocity is about 3 (mm/s) at about 9 (sec) after the circulation drive pump 408 is stopped. Therefore, in S1004 of FIG. 10, the threshold value of the elapsed time from the time the circulation drive pump 408 stops driving is set to 9 (sec) in advance. Accordingly, an appropriate wiping operation can be performed according to the threshold value, and, thus, color mixture can be suppressed.

Here, the relationship among a time period from the time the circulation drive pump 408 stops, ink flow velocity, and whether or not to perform the wiping operation while performing winding for the respective timings of the wiping operations explained in the description above, is summarized in Table 1.

TABLE 1

| TIMING OF WIPING | DURING PRINTING OPERATION | BETWEEN PAGES | BEFORE CAP CLOSING | AT THE TIME OF STARTING PRINTING | DURING CLEANING SEQUENCE |
|---|---|---|---|---|---|
| TIME PERIOD FROM PUMP STOP (sec) | 0 | ABOUT 3.0 | ABOUT 10.0 | ABOUT 20 OR MORE | ABOUT 20 OR MORE |
| INK FLOW VELOCITY (mm/s) | ABOUT 12.5 | ABOUT 8.0 | ABOUT 2.2 | 0 | 0 |
| WHETHER WIPING IS PERFORMED WHILE WINDING | YES | YES | NO | NO | NO |
| WINDING LENGTH (mm) | 25 | 25 | 0 | 0 | 0 |

As explained above, according to the present embodiment, it is possible to suppress a color mixture of ink or entering of foreign substances into channels during maintenance, while suppressing a decrease in productivity. Specifically, in a case when the ink flow velocity is fast, the wiping is performed while winding the cleaning member. As a result, it is possible to suppress the problem that the color-mixed ink flows deep through the vicinity of an ejection port by wiping. Further, by doing so only in a case where the ink flow velocity is fast, it is possible to suppress the consumption amount of the cleaning member.

Second Embodiment

In the first embodiment, the wiping operation is performed according to the result of comparing the elapsed time from the time the circulation drive pump 408 stops with the threshold value. Specifically, in a case when the elapsed time is equal to or less than the threshold value, the wiping operation is performed with a new non-woven fabric while the winding operation of the cleaning member 64 is performed, and, in a case when the elapsed time is greater than the threshold value, the wiping operation without the winding operation is performed, after renewing with a new non-woven fabric, before the wiping operation. In the present embodiment, it is considered to change the wiping speed of the wiping operation without performing the winding operation by comparing the elapsed time from the time the circulation drive pump 408 stops with a threshold value. Here after, a detailed explanation is given.

<Wiping Operation>

Hereafter, an explanation is given of the wiping operation of the maintenance mechanism 60 in the second embodiment.

Therefore, it is not necessary to slow down the wiping speed so that the cleaning member 64 is sufficiently soaked with ink, and, to the contrary, by making the wiping speed faster, the time period for the wiping operation can be shortened.

Figure 15:
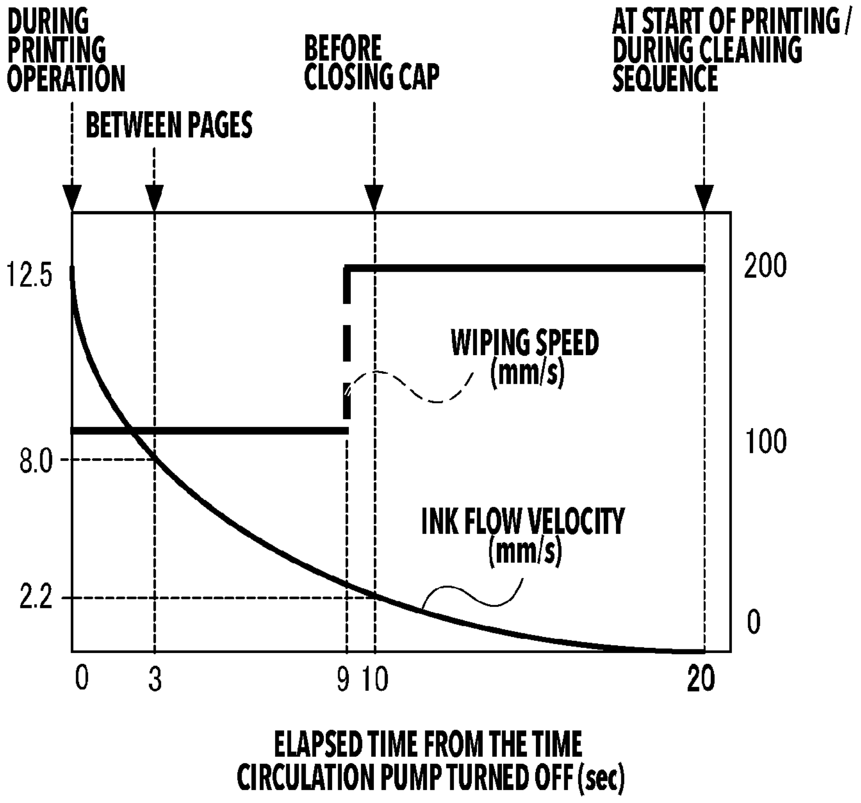
FIG. 15 is a graph illustrating ink flow velocity and wiping speed according to elapsed time from the stop of the circulation drive pump.

FIG. 15 is a diagram in which ink flow velocity and wiping speed at the respective timings of the wiping operations are indicated, along with the elapsed time from the time the circulation drive pump 408 stops. In the case of the present embodiment, the time period from the time the circulation drive pump 408 stops is compared with a predetermined threshold value (9 (sec)), and, in a case when the time period is less than the threshold value, the wiping operation is performed at a relatively slow wiping speed, and, in a case when the time period is greater than the threshold value, the wiping operation is performed at a relatively high wiping speed. Specifically, as illustrated in FIG. 15, the wiping speed is set to 100 (mm/s) in a case when the time period from the time the circulation drive pump 408 stops is equal to or less than the threshold value. Thereby, color mixture can be suppressed. On the other hand, in a case of being greater than the threshold value, the wiping speed is set to 200 (mm/s). Further, preliminary ejection of one hundred shots per ejection port is performed at a drive frequency of 5 kHz.

TABLE 2

| TIMING OF WIPING | DURING PRINTING OPERATION | BETWEEN PAGES | BEFORE CAP CLOSING | AT THE TIME OF STARTING PRINTING | DURING CLEANING SEQUENCE |
|---|---|---|---|---|---|
| TIME PERIOD FROM PUMP STOP (sec) | 0 | ABOUT 3.0 | ABOUT 10.0 | ABOUT 20 OR MORE | ABOUT 20 OR MORE |
| INK FLOW VELOCITY (mm/s) | ABOUT 12.5 | ABOUT 8.0 | ABOUT 2.2 | 0 | 0 |
| WIPING SPEED (mm/s) | 100 | 100 | 200 | 200 | 200 |
| NUMBER OF TIMES OF PRELIMINARY EJECTION | 100 | 100 | 100 | 100 | 100 |

Figure 14:
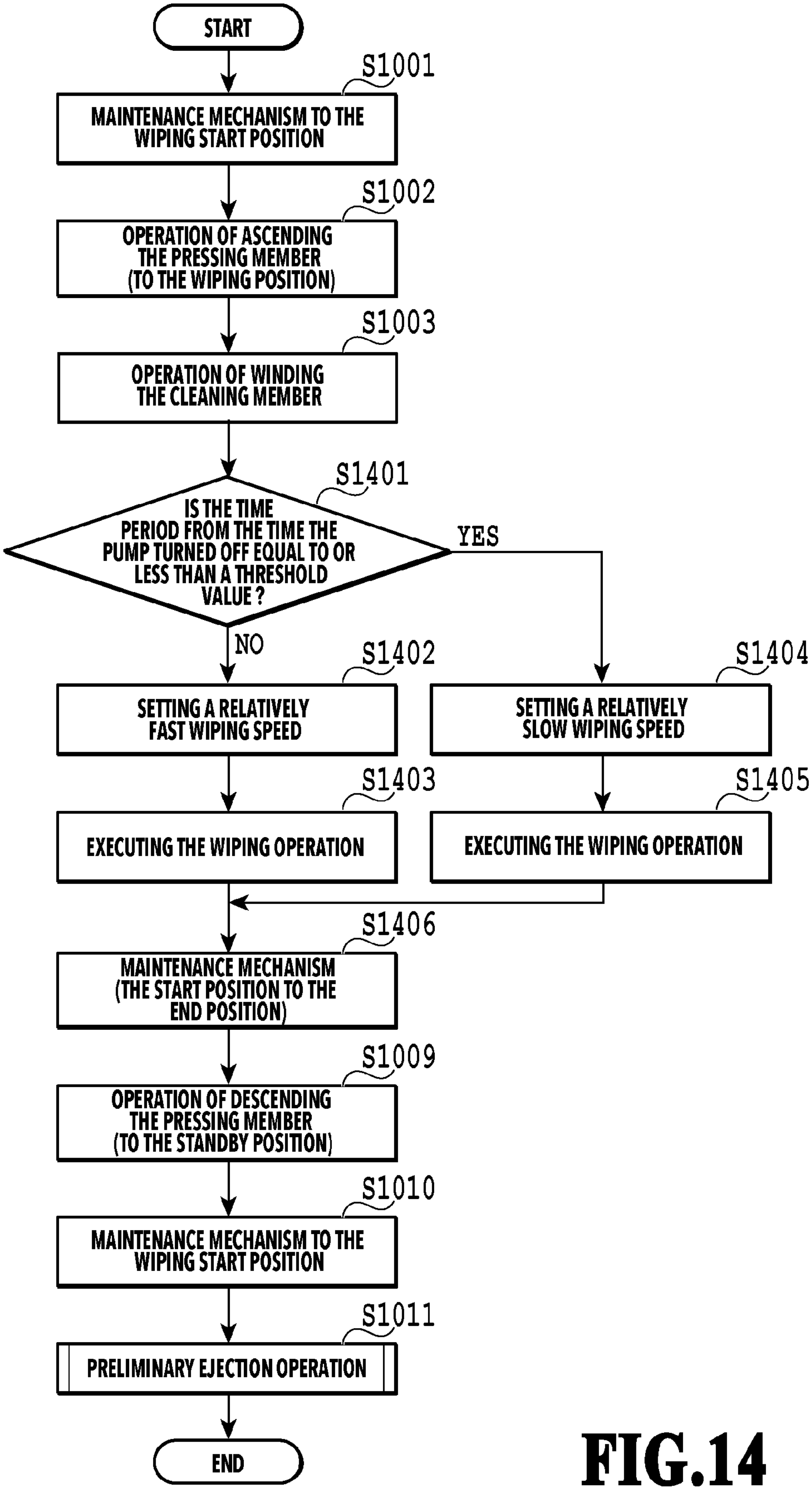
FIG. 14 is a diagram illustrating the configuration of ejection ports and channels formed in a chip 403.

FIG. 14 is a flow chart of the wiping operation performed by the maintenance mechanism 60 in the present embodiment. Note that, in the present flow, S1001 to S1003 and S1009 to S1011 are the same processes as S1001 to S1003 and S1009 to S1011 in FIG. 10 explained in the first embodiment, and, thus, an explanation thereof is omitted.

In S1401, the printing apparatus 101 compares the time period from the time the circulation drive pump 408 stopped with a predetermined threshold value.

In a case of being equal to or less than the threshold value, the wiping operation is performed in S1404 at a relatively slower wiping speed than the normal speed. Accordingly, for the ink with a fast circulatory flow immediately after the circulation drive pump 408 stops, the ink sufficiently seeps out from the ejection ports to the cleaning member 64, and, thus, entering of wiped ink of another color can be suppressed.

On the other hand, in a case of being greater than the threshold value, the wiping operation is performed in S1402 at a wiping speed relatively faster than the normal speed. Because a sufficient time period has elapsed since the circulation drive pump 408 is stopped, the circulatory flow of the present step becomes slow. For this reason, the degree of the color-mixed ink deeply entering an ejection port is low and, thus, can be discharged by preliminary ejection.

As described above, according to the present embodiment, in a case when the ink flow velocity is fast, the wiping is performed at a relatively slow wiping speed. As a result, it is possible to suppress the problem that the color-mixed ink flows deep through the vicinity of an ejection port by wiping. Further, in a case when the ink flow velocity is low due to the passage of time period after the circulation drive pump 408 stops, the wiping operation is performed at a relatively high speed, so as to thereby reduce the time period required for the wiping operation.

Third Embodiment

In the above-described embodiment, an explanation is given that the wiping operation is performed while winding the cleaning member, and the wiping speed is changed according to the elapsed time from the time the circulation drive pump 408 stops. In the present embodiment, an explanation is given of a method of changing both the winding length of the cleaning member and the wiping speed according to whether the circulation pump is in a driving state or in a stopped state.

<Wiping Operation>

Hereafter, an explanation is given of the wiping operation of the maintenance mechanism 60 in the third embodiment.

Figure 16:
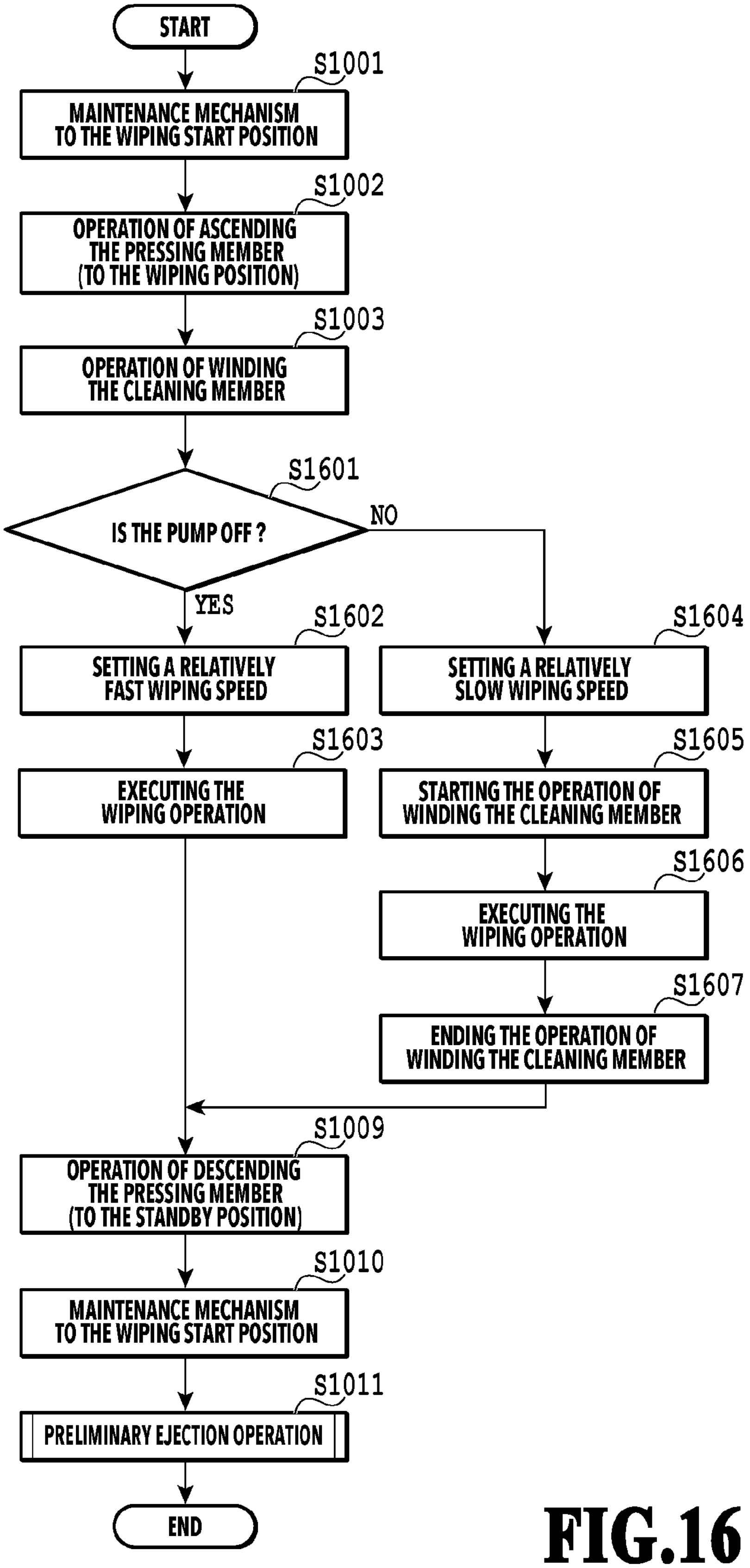
FIG. 16 is a diagram illustrating a processing flow of the maintenance mechanism.

FIG. 16 is a diagram for explaining a flowchart of the wiping operation of the present embodiment. Note that, in the present flow, S1001 to S1003 and S1009 to S1011 are the same processes as S1001 to S1003 and S1009 to S1011 in FIG. 10 explained in the first embodiment, and, thus, an explanation thereof is omitted.

In S1601, the printing apparatus 101 determines whether the circulation drive pump 408 is stopped. In a case when the circulation drive pump 408 is stopped, i.e., in the case of S1602, the printing apparatus 101 performs the wiping operation at a relatively high wiping speed in S1603.

On the other hand, in a case when the circulation drive pump 408 is not stopped, i.e., in a case when the circulation drive pump 408 is being driven, the printing apparatus 101 sets a relatively slow wiping speed in S1604. Then, the winding operation of the cleaning member 64 is started in S1605, and, in S1606, the wiping operation is performed while performing the winding operation. Accordingly, the area to be pressed against the ejection port forming surface by the pressing member 66 is always renewed with a new surface, so that the ink can sufficiently seep out from the ejection ports to the cleaning member 64, and thus entering of ink can be suppressed. In 51607, the printing apparatus 101 ends the winding operation upon completion of the wiping operation.

Figure 17:
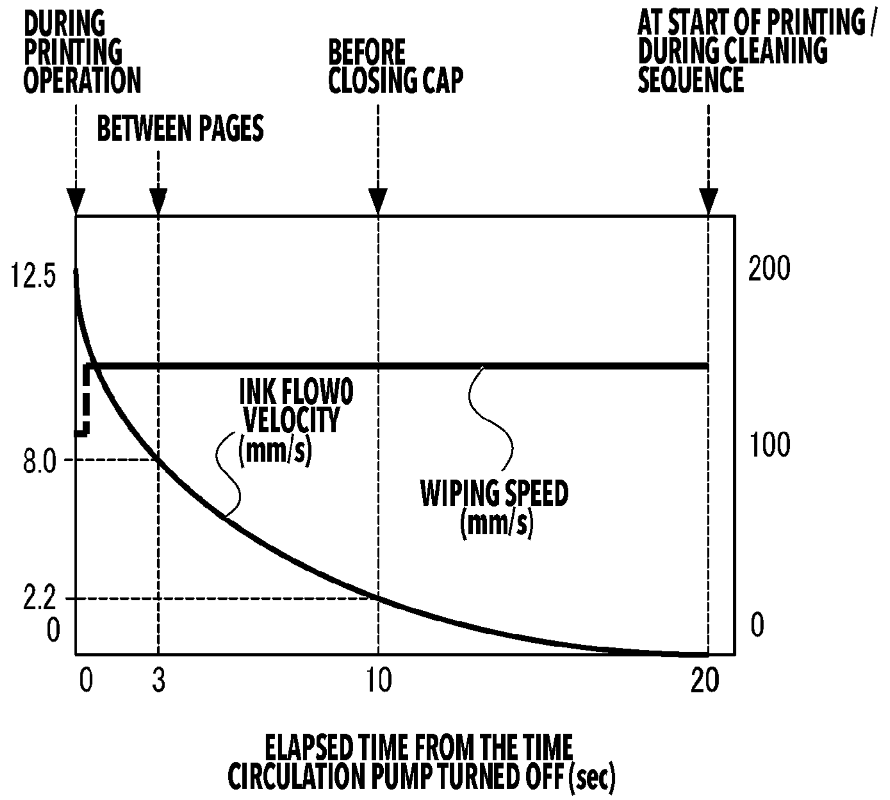
FIG. 17 is a graph illustrating ink flow velocity and wiping speed according to elapsed time from the stop of the circulation drive pump.

FIG. 17 is a diagram in which ink flow velocity and wiping speed at the respective timings of the wiping operations are indicated, along with elapsed time from the time the circulating pump stops driving. In the case of the present embodiment, the printing apparatus 101 determines whether or not the circulation drive pump 408 is stopped, and, in a case of being stopped, the wiping operation is performed at a relatively fast wiping speed, and, in a case of being driven, the wiping operation is performed at a relatively slow wiping speed. Specifically, as illustrated in FIG. 17, the wiping speed is set to 140 (mm/s) in a case when the circulation drive pump 408 is stopped. On the other hand, in a case when the circulation pump is driven, the wiping speed is set to 100 (mm/s). Further, in a case when the circulation drive pump 408 is driven, the wiping operation is performed while performing the winding operation. Thereby, color mixture can be suppressed more.

In Table 3, the relationship among time period from the stop of the circulation drive pump 408, ink flow velocity, wiping speed, whether the wiping operation is performed, winding length, and number of times of preliminary ejection for the respective timings of the wiping operations, is illustrated.

TABLE 3

| TIMING OF WIPING | DURING PRINTING OPERATION | BETWEEN PAGES | BEFORE CAP CLOSING | AT THE TIME OF STARTING PRINTING | DURING CLEANING SEQUENCE |
|---|---|---|---|---|---|
| PUMP DRIVEN/STOPPED | DRIVEN | STOPPED | STOPPED | STOPPED | STOPPED |
| INK FLOW VELOCITY (mm/s) | ABOUT 12.5 | ABOUT 8.0 | ABOUT 2.2 | 0 | 0 |
| WHETHER WIPING IS PERFORMED WHILE WINDING | YES | NO | NO | NO | NO |
| WINDING LENGTH | 25 | 0 | 0 | 0 | 0 |
| WIPING SPEED (mm/s) | 100 | 140 | 140 | 140 | 140 |
| NUMBER OF TIMES OF PRELIMINARY EJECTION | 100 | 150 | 100 | 100 | 100 |

As explained above, according to the present embodiment, in a case when the circulation drive pump 408 is being driven, the wiping is performed at a relatively slow wiping speed while winding the cleaning member. As a result, it is possible to suppress the color-mixed ink from flowing deep through the vicinity of an ejection port by wiping. Further, in a case when the circulation drive pump 408 is stopped, the time period required for the wiping operation can be shortened by performing the relatively fast wiping operation.

Fourth Embodiment

In the present embodiment, an explanation is given of an example in which the above-described embodiments are applied to a full-line type printing apparatus using a print head with a length corresponding to the entire width of print paper.

Figure 18:
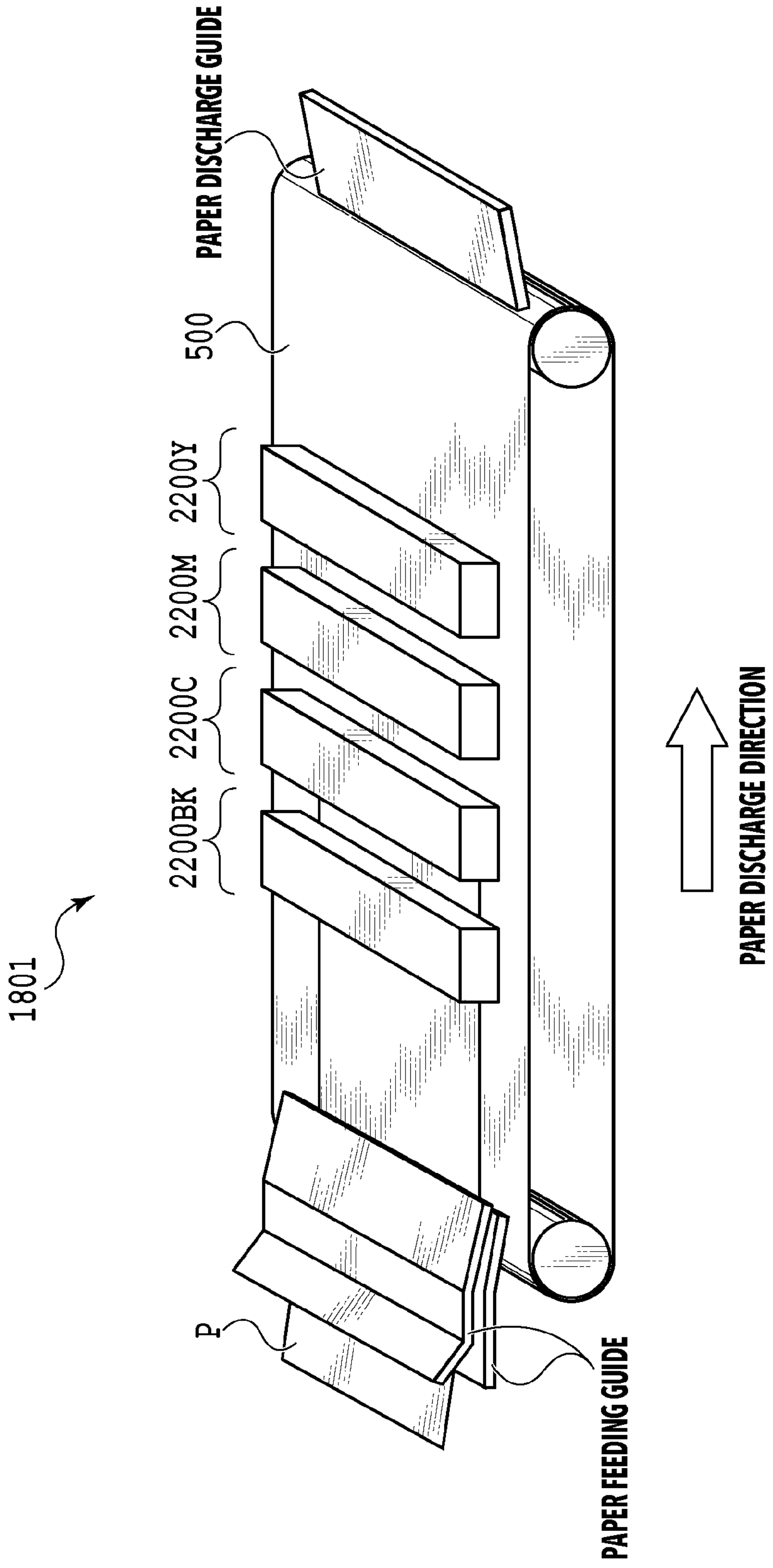
FIG. 18 is a schematic configuration diagram of a printing apparatus.

FIG. 18 is a schematic side view illustrating the configuration of the inkjet printing apparatus 1801 of the present embodiment. The print heads 2200BK to 2200Y are configured with multiple full multi-type print heads arranged side by side in which ejection ports are arranged side by side over the entire width of the printing area so as to enable multi-color printing. The print heads include the four print heads 2200K, 2200C, 2200M, and 2200Y that eject black (K), cyan (C), magenta (M), and yellow (Y) inks, respectively.

The conveyance belt 500 is an endless belt that conveys the print medium P and is held by two rollers so as to be rotatable in the direction of the arrow. The print medium is fed in the direction of the arrow by the conveyance belt 500, and printing is performed by ink ejection applied in the order of the print heads 2200K, 2200C, 2200M, and 2200Y.

Also, in the present embodiment, the maintenance mechanism 60 as illustrated in FIG. 8A performs a wiping operation on the ejection ports of the print heads. At that time, the print heads may move to the wiping start position, or the maintenance mechanism 60 may move in relation to the fixed print heads so as to move to the wiping start position. The operation of the maintenance mechanism 60 after moving to the wiping start position is the same as that explained in the above-described embodiments. That is, even in a full-line type printing apparatus, in a case when the ink flow velocity is fast, the wiping is performed while winding the cleaning member, or the wiping is performed at a relatively slow wiping speed. As a result, it is possible to suppress the problem that the color-mixed ink flows deep through the vicinity of an ejection port by wiping.

Other Embodiments

In the above-described embodiments, the wiping direction and the winding direction of the cleaning member are the same direction, and, in a case when the winding operation is performed with the wiping operation (winding length>0), the area of the cleaning member 64 abuts the ejection port surface while being renewed, so as to wipe the ejection port surface. However, it is also possible that the wiping direction of the cleaning member 64 and the winding direction of the cleaning member 64 are in opposite directions. In a case when the wiping direction and the winding direction are in opposite directions, and the wiping operation is not performed while the winding operation is performed, the cleaning sequence is performed in the same manner as in the above-described embodiments.

On the other hand, in a case when the wiping direction and the winding direction are in opposite directions, and the wiping operation is performed while the winding operation is performed, it is desirable that the wiping speed of the cleaning member 64 and the winding speed of the cleaning member 64 are different. This is because, in a case of "wiping speed=winding speed," the cleaning member 64 moves while abutting the ejection port surface without wiping, and, thus, a sufficient cleaning performance cannot be obtained. The magnitude relationship between the wiping speed and the winding speed may be "wiping speed<winding speed" or "wiping speed>winding speed." Regardless of the magnitude relationship, the area of the cleaning member 64 abuts the ejection port surface while being renewed, so as to wipe the ejection port surface in the wiping operation.

Further, although the maintenance mechanism 60 is such that the cleaning member 64 performs the wiping operation in parallel to the ejection port arrays and the cleaning member 64 is wound in the above-described embodiments, there is not limitations as such. For example, it is also possible to configure the maintenance mechanism such that the cleaning member 64 performs the wiping operation in parallel to the ejection port arrays and the cleaning member 64 is wound perpendicularly to the ejection port arrays. Further, it is also possible to configure the maintenance mechanism such that the cleaning member performs the wiping operation perpendicularly to the ejection port arrays and the cleaning member 64 is wound up.

Further, in the above-described embodiments, whether or not the winding operation of the cleaning member 64 is performed or the wiping speed is determined according to whether or not the circulation drive pump 408 is being driven or the elapsed time from the time the circulation drive pump 408 stops. Alternatively, it is also possible that a flow rate sensor is used to measure if the ink is actually circulating, so that the determination is based on the result thereof.

Table 4 represents ink flow velocity over an elapsed time from the time the circulation pump stops, which is measured by use of a flow rate sensor.

TABLE 4

| ELAPSED TIME (sec) | 0 | 5 | 10 | 15 | 20 |
|---|---|---|---|---|---|
| INK FLOW VELOCITY (mm/s) | 12.5 | 7.3 | 2.2 | 1.2 | 0.2 |

Furthermore, the frequency of wiping the multiple ejection port arrays, the amount of adhering mist, the amount of image application, the distance between the ejection port surface and the print medium, the environmental temperature, etc., affect the amount of mist adhering to the ejection port surface, and, thus, the determination may be made according to any of them.

Further, in the above-described embodiments, whether or not the winding operation of the cleaning member 64 is performed, or the wiping speed is classified into two stages according to whether or not the circulation drive pump 408 is being driven, or the elapsed time from the time the circulation drive pump 408 stops. However, the number of classifications is not limited as such. At the timings of the wiping operations such as during a printing operation, at the start of a printing operation, during a cleaning sequence, between pages, and before closing the cap, the ink flow velocity changes since the elapsed time from the time the pump stops changes due to the wait between scans, an automatic cutting process, the type of cleaning sequence, etc. Further, there are also other timings, such as at the time of replacing the head or at the time when a paper jam error occurs. Classification into a number of groups (e.g., FIG. 19A, FIG. 19B, and FIG. 19C) so as to optimize the suppression of color mixture at such timings is also possible.

Figure 19A:
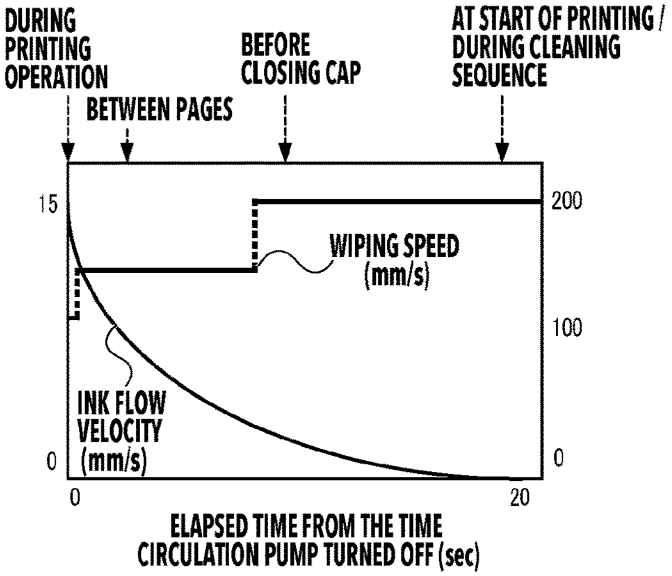
FIG. 19A to FIG. 19C are graphs illustrating ink flow velocity, wiping speed, or winding length according to an elapsed time from the stop of the circulation drive pump.
Figure 19B:
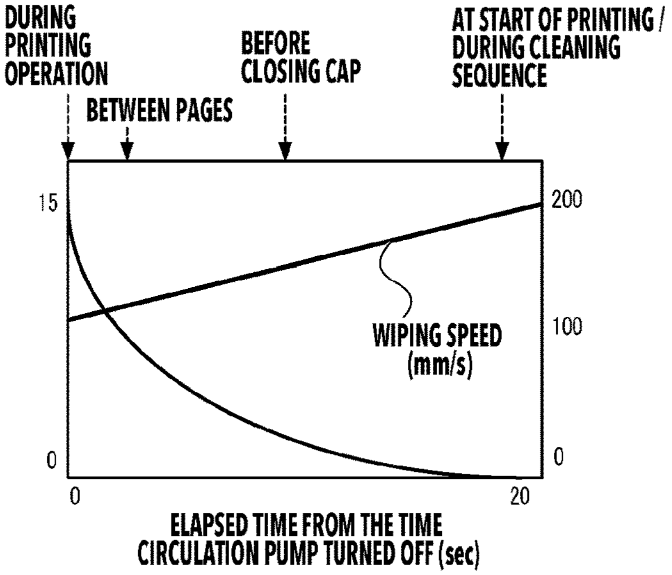
Figure 19C:
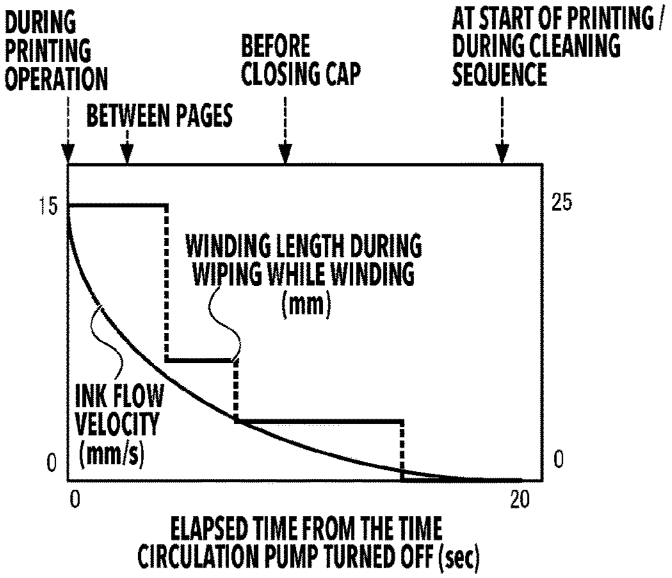

FIG. 19A is a diagram in which the wiping speed is classified into three stages according to the elapsed time from the time the circulation drive pump 408 stops. FIG. 19B is a diagram of a case in which the wiping speed is increased in proportion to the elapsed time from the time the circulation drive pump stops. FIG. 19C is a diagram in which the winding length during the wiping operation is classified into four stages according to the elapsed time from the time the circulation drive pump stops. Note that the classification method is not limited to the three classification examples illustrated in FIG. 19A to FIG. 19C.

Further, although the wiping is performed in the direction parallel to the ejection port arrays and the winding of the cleaning member is performed in the wiping direction in the above-described embodiments, the wiping direction and the winding direction are not limited as such. The wiping direction may be a direction perpendicular to the ejection port arrays, and the winding direction may be the direction opposite to the wiping direction.

Further, although the surface on which ejection has been performed is wiped in the wiping operation by moving the maintenance mechanism 60 in a state when the print head 110 is stopped in the above-described embodiments, there are not limitations as such. For example, such a form in which at least one of the maintenance mechanism 60 and the print head 110 moves to wipe the ejection port surface. That is, the ejection port surface may be wiped by moving the print head 110. Further, the ejection port surface may be wiped by moving both the print head 110 and the maintenance mechanism 60. In any case, the above-described wiping speed may be considered as a speed at which the relative positions of the print head 110 and the maintenance mechanism 60 change.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:

a print head configured to eject ink, which has flowed from a first channel into a pressure chamber, from a nozzle, by driving an ejection energy generating element installed in the pressure chamber;

a circulation pump configured to circulate the ink in a circulation channel including the first channel, the pressure chamber, and a second channel that flows the ink inside the pressure chamber to the outside of the pressure chamber;

a wiping unit configured with a cleaning member that can wipe an ejection port surface of an ejection port and a winding member that winds the cleaning member; and a control unit configured to control a cleaning operation in which the wiping unit wipes the ejection port surface, so that, in a case when the cleaning operation is performed after the circulation pump is stopped, the cleaning operation is changed, based on an elapsed time from the time the circulation pump stopped driving, wherein, in a case when the elapsed time is equal to or less than a predetermined threshold value, the control unit causes the wiping unit to perform a first cleaning operation, in which the wiping unit is moved so as to wipe the ejection port surface while winding of the cleaning member is performed, and, in a case when the elapsed time is greater than the predetermined threshold vale, the control unit causes the wiping unit to perform a second cleaning operation, in which the wiping unit is moved so as to wipe the ejection port surface without the winding of the cleaning member.

2. The printing apparatus according to claim 1, wherein the cleaning operation includes a third cleaning operation, in which the wiping unit is moved at a first speed so as to wipe the ejection port surface without winding of the cleaning member, and a fourth cleaning operation, in which the wiping unit is moved at a second speed that is faster than the first speed so as to wipe the ejection port surface without the winding of the cleaning member.

3. The printing apparatus according to claim 2, wherein, in a case when the elapsed time is equal to or less than the predetermined threshold value, the control unit causes the wiping unit to perform the third cleaning operation, and, in a case when the elapsed time is greater than the predetermined threshold value, the control unit causes the wiping unit to perform the fourth cleaning operation.

4. The printing apparatus according to claim 1, wherein a winding length of the cleaning member is changed according to the elapsed time from the time the circulation pump stopped driving or whether the circulation pump is driven.

5. The printing apparatus according to claim 1, wherein the cleaning member is a sheet-like non-woven fabric.

6. The printing apparatus according to claim 1, wherein the wiping unit performs wiping in a direction parallel to or perpendicular to an ejection port array, which includes a plurality of ejection ports.

7. The printing apparatus according to claim 1, wherein the control unit further controls the cleaning operation, based on any of a frequency of wiping an ejection port array, an amount of adhering mist, an amount of image application, a distance between the ejection port surface and a print medium, and an environmental temperature.

8. A method of controlling a printing apparatus including a print head configured to eject ink, which has flowed from a first channel into a pressure chamber, from a nozzle by driving an ejection energy generating element installed in the pressure chamber, a circulation pump configured to circulate the ink in a circulation channel including the first channel, the pressure chamber, and a second channel that flows the ink inside the pressure chamber to the outside of the pressure chamber, and a wiping unit configured with a cleaning member that can wipe an ejection port surface of an ejection port and a winding member that winds the cleaning member, the method comprising a control step of controlling a cleaning operation in which the wiping unit wipes the ejection port surface, so that, in a case when the cleaning operation is performed after the circulation pump is stopped, the cleaning operation is changed based on an elapsed time from the time the circulation pump stopped driving, wherein, in a case when the elapsed time is equal to or less than a predetermined threshold value, the control unit causes the wiping unit to perform a first cleaning operation, in which the wiping unit is moved so as to wipe the ejection port surface while winding of the cleaning member is performed, and, in a case when the elapsed time is greater than the predetermined threshold vale, the control unit causes the wiping unit to perform a second cleaning operation, in which the wiping unit is moved so as to wipe the ejection port surface without the winding of the cleaning member.

* * * * *